US011679802B2

(12) United States Patent
Yamaguchi et al.

(10) Patent No.: US 11,679,802 B2
(45) Date of Patent: Jun. 20, 2023

(54) STEERING CONTROL DEVICE

(71) Applicant: JTEKT CORPORATION, Osaka (JP)

(72) Inventors: Takafumi Yamaguchi, Kuwana (JP);
Takahiro Toko, Takahama (JP);
Nobuaki Kataoka, Okazaki (JP);
Yukinobu Ezaki, Kasugai (JP)

(73) Assignee: JTEKT CORPORATION, Osaka (JP)

( * ) Notice: Subject to any disclaimer, the term of this patent is extended or adjusted under 35 U.S.C. 154(b) by 398 days.

(21) Appl. No.: 17/030,617

(22) Filed: Sep. 24, 2020

(65) Prior Publication Data

US 2021/0094610 A1 Apr. 1, 2021

(30) Foreign Application Priority Data

Sep. 26, 2019 (JP) .............................. JP2019-175763
Sep. 26, 2019 (JP) .............................. JP2019-175764

(51) Int. Cl.
*B62D 5/04* (2006.01)
*B62D 15/02* (2006.01)

(52) U.S. Cl.
CPC ......... *B62D 5/0469* (2013.01); *B62D 5/0421* (2013.01); *B62D 15/0225* (2013.01)

(58) Field of Classification Search
CPC ................ B62D 5/0421; B62D 5/0469; B62D 15/0245; B62D 5/0484; B62D 5/0463; B62D 5/0409; B62D 15/021; B62D 7/1536; B62D 5/04; G01D 5/245; G01B 21/00; G01B 21/22
See application file for complete search history.

(56) References Cited

U.S. PATENT DOCUMENTS

| 4,669,745 | A  | * | 6/1987  | Miki ..................... B62D 7/1536 180/410 |
| 11,130,521 | B2 | * | 9/2021  | Hosono .............. B62D 15/0245 |
| 2018/0194389 | A1 | * | 7/2018  | Imamura .............. B62D 5/0469 |
| 2019/0346287 | A1 | * | 11/2019 | Koike .................... G01D 5/245 |
| 2019/0367085 | A1 | * | 12/2019 | Kataoka ............... B62D 5/0484 |
| 2020/0023898 | A1 | * | 1/2020  | Hosono .............. B62D 15/0245 |

(Continued)

FOREIGN PATENT DOCUMENTS

EP     3 409 562 A1    12/2018
EP     3 498 571 A1     6/2019
(Continued)

OTHER PUBLICATIONS

Feb. 17, 2021 Extended Search Report issued in European Patent Application No. 20198111.5.

*Primary Examiner* — Yuri Kan, P.E.
(74) *Attorney, Agent, or Firm* — Oliff PLC

(57) ABSTRACT

A steering control device includes an electronic control unit. The electronic control unit detects an absolute steering angle. The electronic control unit controls driving of a motor. The electronic control unit determines whether movement of a turning shaft to one of right and left sides has been limited by an end contact or execution of end contact relaxation control. The electronic control unit acquires a plurality of limit position determination angles corresponding to the absolute steering angle. The electronic control unit permits update of an end-position-corresponding angle. The electronic control unit updates the end-position-corresponding angle stored in the electronic control unit.

8 Claims, 9 Drawing Sheets

(56) References Cited

U.S. PATENT DOCUMENTS

| | | | |
|---|---|---|---|
| 2021/0078628 A1* | 3/2021 | Toko | B62D 5/0463 |
| 2021/0094608 A1* | 4/2021 | Toko | B62D 5/0409 |
| 2021/0094609 A1* | 4/2021 | Toko | B62D 15/021 |
| 2021/0122413 A1* | 4/2021 | Yamaguchi | B62D 5/0469 |
| 2021/0229737 A1* | 7/2021 | Yamaguchi | B62D 5/0469 |

FOREIGN PATENT DOCUMENTS

| | | | | |
|---|---|---|---|---|
| JP | H01250716 A | * | 10/1989 | G01B 21/22 |
| JP | H02128110 A | * | 5/1990 | G01B 21/00 |
| JP | 2015-020506 A | | 2/2015 | |

* cited by examiner

STEERING CONTROL DEVICE

CROSS-REFERENCE TO RELATED APPLICATION

This application claims priority to Japanese Patent Application No. 2019-175763 filed on Sep. 26, 2019 and Japanese Patent Application No. 2019-175764 filed on Sep. 26, 2019, each incorporated herein by reference in its entirety.

BACKGROUND

1. Technical Field

The disclosure relates to a steering control device.

2. Description of Related Art

An electric power steering system (EPS) including an actuator with a motor as a drive source is known as a vehicular steering system. As such an EPS, there is an EPS that acquires a steering angle of a steering wheel as an absolute angle including a range exceeding 360° and performs various types of control based on the steering angle. As examples of such control, for example, Japanese Unexamined Patent Application Publication No. 2015-20506 (JP 2015-20506 A) and Japanese Patent No. 5962881 (JP 5962881 B) disclose that end contact relaxation control for relaxing an impact of a so-called end contact in which a rack end which is an end of a rack shaft comes into contact with a rack housing is performed. In the EPS described in JP 2015-20506 A, an impact of an end contact is relaxed by correcting a current command value corresponding to a target value of a motor torque which is output from a motor using a steering reaction component based on a steering angle. In the EPS described in JP 5962881 B, an impact of an end contact is relaxed by limiting a current command value corresponding to a target value of a motor torque which is output from a motor to being equal to or less than a limit value based on a steering angle.

SUMMARY

In the configurations of the related art in which end contact relaxation control is performed, a rack end position at which movement of the rack shaft is limited due to the end contact is correlated with the steering angle and this angle is stored as an end-position-corresponding angle. However, for example, due to replacement of a steering shaft at the time of repair of a vehicle, an actual end angle at which an end contact actually occurs and the stored end-position-corresponding angle may be different from each other.

As a result, when the stored end-position-corresponding angle is displaced to a neutral steering position side with respect to the actual end angle, there is concern that an increase in a steering reaction component due to performing of end contact relaxation control or a limitation of the current command value will be insufficient and an impact of the end contact will not be able to be satisfactorily relaxed. However, the difference between the actual end angle and the stored end-position-corresponding angle is not mentioned in JP 2015-20506 A and JP 5962881 B, and there is demand for development of a technique capable of inhibiting such a difference.

The disclosure provides a steering control device that can decrease displacement of a stored end-position-corresponding angle to a neutral steering position side with respect to an actual end angle.

A first aspect of the disclosure provides a steering control device. The steering control device controls a steering system including a housing, a turning shaft that is accommodated in the housing such that the turning shaft is able to reciprocate, and an actuator that applies a motor torque for causing the turning shaft to reciprocate using a motor as a drive source. The steering control device includes an electronic control unit. The electronic control unit is configured to detect an absolute steering angle which is a rotation angle of a rotation shaft which is able to be converted into a turning angle of turning wheels connected to the turning shaft and which is expressed as an absolute angle including a range exceeding 360°. The electronic control unit is configured to control driving of the motor such that the motor torque reaches a torque command value. The electronic control unit is configured to store an end-position-corresponding angle. The electronic control unit is an angle which indicates an end position at which movement of the turning shaft is limited and which is correlated with the absolute steering angle. The electronic control unit is configured to perform end contact relaxation control when an end separation angle indicating a distance of the absolute steering angle from the end-position-corresponding angle is equal to or less than a predetermined angle. The end contact relaxation control is control for correcting the torque command value such that a decrease of the end separation angle is limited. The electronic control unit is configured to determine whether the movement of the turning shaft to one of right and left sides has been limited by the end contact or execution of the end contact relaxation control. The electronic control unit is configured to acquire a plurality of limit position determination angles corresponding to the absolute steering angle when the electronic control unit determines that the movement of the turning shaft has been limited. The electronic control unit is configured to permit update of the end-position-corresponding angle based on a variance of the plurality of limit position determination angles. The electronic control unit is configured to update the end-position-corresponding angle stored in the electronic control unit when the electronic control unit permits update of the end-position-corresponding angle.

The limit position determination angles which are acquired when it is determined that the movement of the turning shaft has been limited by execution of end contact relaxation control may vary, for example, depending on the magnitude of a road surface μ. On the other hand, the limit position determination angles which are acquired when it is determined that the movement of the turning shaft has been limited by an end contact are mechanically determined depending on the structure of the steering system and thus are less likely to vary. Accordingly, when the variance of the plurality of limit position determination angles is relatively small, it is thought that the movement of the turning shaft has not been limited by execution of end contact relaxation control based on the stored end-position-corresponding angle and the movement of the turning shaft has been limited by an end contact. That is, it is thought that a stored end-position-corresponding angle is displaced to a neutral steering position side with respect to an actual end angle. Accordingly, with this configuration, it is possible to decrease displacement of the stored end-position-corresponding angle to the neutral steering position side with respect to an actual end angle by permitting update of the end-position-corresponding angle based on the variance of the plurality of limit position determination angles and updating the end-position-corresponding angle stored in the electronic control unit.

In the steering control device, the electronic control unit may be configured to calculate a determination variance value which is a variance value of n (where n is an integer equal to or greater than 2) limit position determination angles using the following expression. The electronic control unit may be configured to set a variance value of the plurality of limit position determination angles when the movement of the turning shaft has been limited by the end contact as a predetermined variance value. The electronic control unit may be configured to determine the n limit position determination angles to be predetermined data acquired when a variance ratio which is a ratio between the determination variance value and the predetermined variance value is equal to or less than a variance threshold value. The predetermined data may be data which is acquired when the movement of the turning shaft has been limited by the end contact.

$$Vd = \frac{1}{n-1} \sum_{i=1}^{n} (\theta i - \theta ave)^2$$

Here, θave may be an average value of the n limit position determination angles.

With this configuration, it is possible to appropriately determine whether the n limit position determination angles are data which is acquired when the movement of the turning shaft has been limited by an end contact.

In the steering control device, the electronic control unit may be configured to detect an axial force acting on the turning shaft. The electronic control unit may be configured to correlate a determination axial force when the electronic control unit determines that the movement of the turning shaft has been limited with the limit position determination angle. The electronic control unit may be configured to classify the limit position determination angles into a plurality of axial force ranges which is set based on the magnitude of the axial force. The plurality of limit position determination angles which is used to calculate the variance may include one or more limit position determination angles classified into two or more of the plurality of axial force ranges.

With this configuration, since a plurality of limit position determination angles classified into different axial force ranges, that is, a limit position determination angle acquired when the determination axial force is relatively large and the limit position determination angle when the determination axial force is relatively small, is used as data used for determination of the variance, it is possible to more appropriately determine whether the movement of the turning shaft has been limited by an end contact.

In the steering control device, the electronic control unit may be configured to detect an axial force acting on the turning shaft. The electronic control unit may be configured to correlate a determination axial force when the electronic control unit determines that the movement of the turning shaft has been limited with the limit position determination angle. The plurality of limit position determination angles which is used to calculate the variance including a predetermined number of limit position determination angles which are selected in increasing order of the determination axial force.

When the end separation angle is equal to or less than a predetermined angle, the torque command value is corrected such that a decrease of the end separation angle is limited by execution of end contact relaxation control. Accordingly, as the determination axial force decreases, the limit position determination angle which is correlated with the determination axial force is more likely to increase. That is, as the determination axial force becomes less, there is a higher likelihood that the limit position determination angle correlated with the determination axial force will be an angle close to an actual end angle. Accordingly, with this configuration, it is possible to more appropriately determine whether the movement of the turning shaft has been limited by an end contact by calculating the variance based on the predetermined calculate number of the limit position determination angles which are selected in the increasing order of the determination axial force.

In the steering control device, the electronic control unit may be configured to calculate a temporary end separation angle. The temporary end separation angle may indicate a distance of a temporary end position determination angle based on the plurality of limit position determination angles from the end-position-corresponding angle. The electronic control unit may be configured to prohibit update of the end-position-corresponding angle when the end separation angle is the temporary end separation angle and the torque command value which is calculated by execution of the end contact relaxation control is equal to or less than a torque threshold value based on a rated torque.

With this configuration, when the stored end-position-corresponding angle is not displaced to the neutral steering position with respect to the actual end angle and turning is performed at a high speed, for example, on a low μ road, the turning shaft may come into contact with the housing. In this case, when the torque command value is limited to being equal to or less than the torque threshold value, end contact relaxation control based on the stored end-position-corresponding angle can also be performed normally and displacement of the stored end-position-corresponding angle to the neutral steering position side with respect to the actual end angle is considered not to cause any problem. Accordingly, when the torque command value which is calculated based on the temporary end separation angle is equal to or less than the torque threshold value as in the above configuration, it is possible to prevent the end-position-corresponding angle from being unnecessarily updated by not permitting update of the end-position-corresponding angle.

With this configuration, it is possible to decrease displacement of the stored end-position-corresponding angle to the neutral steering position side with respect to the actual end angle.

A second aspect of the disclosure provides a steering control device. The steering control device controls a steering system including a housing, a turning shaft that is accommodated in the housing such that the turning shaft is able to reciprocate, and an actuator that applies a motor torque for causing the turning shaft to reciprocate using a motor as a drive source. The steering control device includes an electronic control unit. The electronic control unit is configured to detect an absolute steering angle which is a rotation angle of a rotation shaft which is able to be converted into a turning angle of turning wheels connected to the turning shaft and which is expressed as an absolute angle including a range exceeding 360°. The electronic control unit is configured to determine whether movement of the turning shaft to one of right and left sides has been limited. The electronic control unit is configured to acquire a plurality of limit position determination angles corresponding to the absolute steering angle when the electronic control unit determines that the movement of the turning shaft has been limited. The electronic control unit is configured to determine whether the plurality of limit position determination angles on the right or left side is predetermined data based on a variance of the plurality of limit position determination angles on the right or left side. The predetermined data is data which is acquired when the movement of the turning shaft has been limited by an end contact in which the turning shaft comes into contact with the housing. The electronic control unit is configured to set an end-position-corresponding angle based on the plurality of limit position determination angles determined to be the predetermined data. The end-position-corresponding angle is an angle which indicates that the turning shaft is located at a right or left end position and which is correlated with the absolute steering angle.

For example, when the movement of the turning shaft has been limited due to contact with a curbstone or the like, the position of the turning shaft changes according to the situation when the turning wheels come into contact with the curb stone or the like and thus the magnitude of the limit position determination angle is likely to vary. On the other hand, when the movement of the turning shaft has been limited by an end contact in which the turning shaft comes into contact with the housing, the position of the turning shaft is determined depending on the structure of the steering system or the like and thus the magnitude of the limit position determination angle is less likely to vary. Accordingly, when the variance of the plurality of limit position determination angles is relatively large, it is thought that the movement of the turning shaft has been limited due to contact with a curbstone or the like. On the other hand, when the variance of the plurality of limit position determination angles is relatively small, it is thought that the movement of the turning shaft has been limited due to an end contact. As a result, it is possible to set an end-position-corresponding angle accurately corresponding to an actual end angle using the variance of the plurality of limit position determination angles.

In the steering control device, the electronic control unit may be configured to calculate a determination variance value which is a variance value of n (where n is an integer equal to or greater than 2) limit position determination angles using the following expression. The electronic control unit may be configured to set a variance value of the plurality of limit position determination angles when the movement of the turning shaft has been limited by the end contact as a predetermined variance value. The electronic control unit may be configured to determine the n limit position determination angles to be the predetermined data acquired when a variance ratio is equal to or less than a variance threshold value which is set depending on n. The variance ratio may be a ratio between the determination variance value and the predetermined variance value (Vm).

$$Vd = \frac{1}{n-1} \sum_{i=1}^{n} (\theta i - \theta ave)^2$$

Here, θave may be an average value of the n limit position determination angles.

With this configuration, it is possible to appropriately determine whether the n limit position determination angles are data which is acquired when the movement of the turning shaft has been limited by an end contact.

In the steering control device, the electronic control unit may be configured to compare a stroke width with a stroke threshold value corresponding to an entire stroke range of the turning shaft when the right and left limit position determination angles are acquired. The stroke width may be a sum of the absolute value of the right limit position determination angle and the absolute value of the left limit position determination angle. The electronic control unit may be configured to set the end-position-corresponding angles on the right and left sides based on the right and left limit position determination angles when the stroke width is greater than the stroke threshold value. The electronic control unit may be configured to set the end-position-corresponding angle on the right or left side based on the plurality of limit position determination angles on the right or left side which is determined to be the predetermined data when the plurality of limit position determination angles on only the right or left side is acquired.

With this configuration, when the limit position determination angles on both the right and left sides are acquired, it is possible to rapidly set the end-position-corresponding angles on both the right and left sides which accurately corresponds to actual end angles without waiting until a plurality of limit position determination angles on the right or left side is acquired by comparing the stroke width with the stroke threshold value. When a plurality of limit position determination angles on only the right or left side is acquired, the end-position-corresponding angle on the right of left side is set based on the plurality of limit position determination angles on the right or left side which is determined to be data acquired when the movement of the turning shaft has been limited by an end contact based on the variance, and thus it is possible to set the end-position-corresponding angle which accurately corresponds to the actual end angle.

With this configuration, it is possible to learn an end-position-corresponding angle accurately corresponding to an actual end angle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
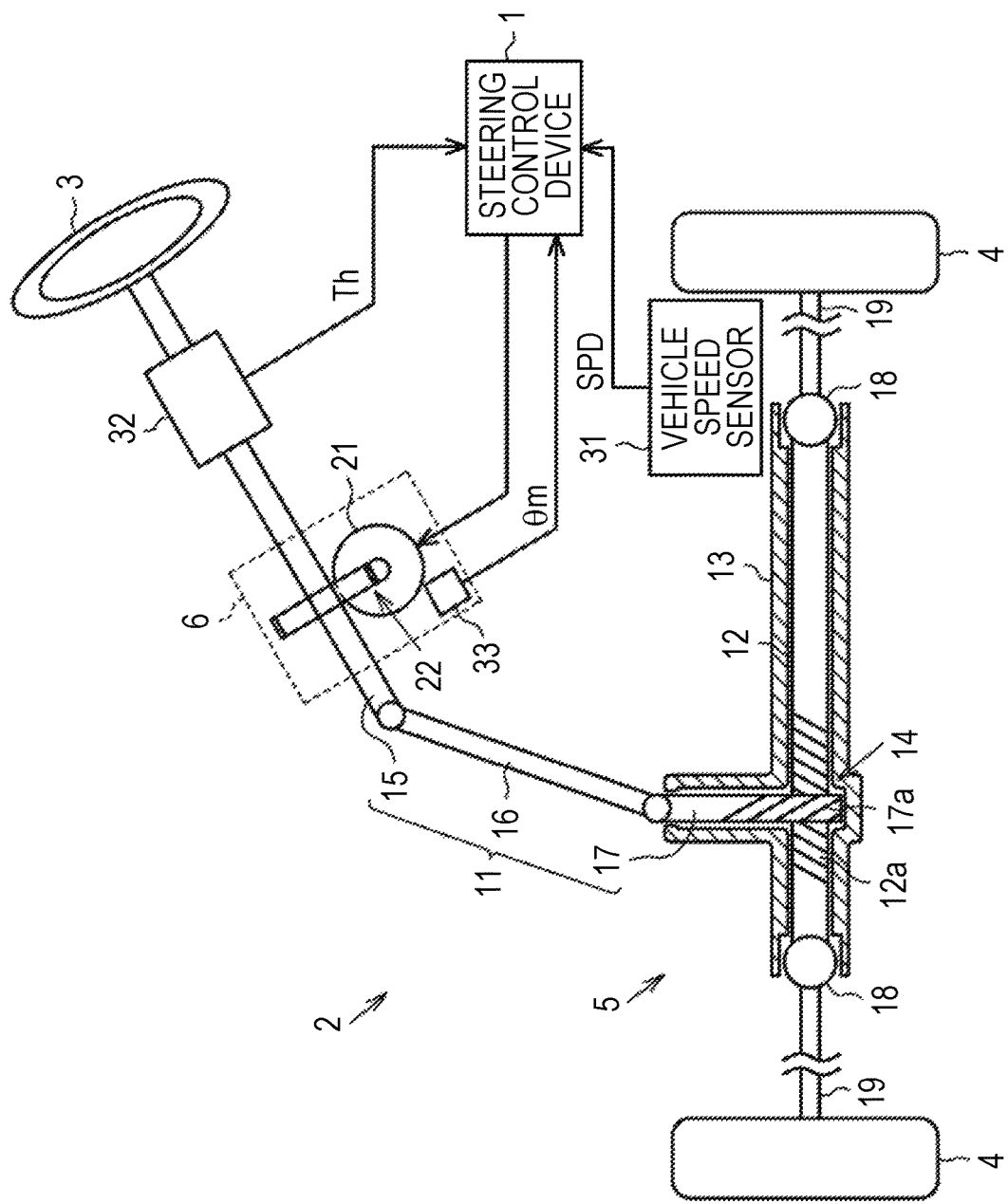
FIG. 1 is a diagram schematically illustrating a configuration of an electric power steering system according to a first embodiment.

Hereinafter, a steering control device according to a first embodiment of the disclosure will be described with reference to the accompanying drawings. As illustrated in FIG. 1, an electric power steering system (EPS) 2 which is a steering system to be controlled by a steering control device 1 includes a steering mechanism 5 that turns turning wheels 4 based on a driver's operation of a steering wheel 3. The EPS 2 further includes an EPS actuator 6 which is an actuator that applies an assist force for assisting a steering operation to the steering mechanism 5.

The steering mechanism 5 includes a steering shaft 11 to which the steering wheel 3 is fixed, a rack shaft 12 which is a turning shaft connected to the steering shaft 11, a rack housing 13 which is a housing into which the rack shaft 12 is inserted such that it can reciprocate, and a rack and pinion mechanism 14 that converts a rotational motion of the steering shaft 11 to a translational motion of the rack shaft 12. The steering shaft 11 has a configuration in which a column shaft 15, an intermediate shaft 16, and a pinion shaft 17 are connected sequentially from the side on which the steering wheel 3 is located.

The rack shaft 12 and the pinion shaft 17 are arranged with a predetermined crossing angle in the rack housing 13. The rack and pinion mechanism 14 has a configuration in which rack teeth 12a formed on the rack shaft 12 and pinion teeth 17a formed on the pinion shaft 17 engage with each other. Tie rods 19 are rotatably connected to both ends of the rack shaft 12 via rack ends 18 of which each is formed of a ball joint provided at one shaft end. The tips of the tie rods 19 are connected to knuckles (not illustrated) to which the turning wheels 4 are assembled. Accordingly, in the EPS 2, a rotational motion of the steering shaft 11 based on a steering operation is converted to a translational motion in an axial direction of the rack shaft 12 by the rack and pinion mechanism 14 and the translational motion in the axial direction is transmitted to the knuckles via the tie rods 19, whereby a turning angle of the turning wheels 4, that is, a travel direction of a vehicle, is changed.

A position of the rack shaft 12 at which the rack end 18 comes into contact with the left end of the rack housing 13 is a position at which the steering wheel 3 can be maximally steered to the right side, and this position corresponds to a rack end position which is a right end position. A position of the rack shaft 12 at which the rack end 18 comes into contact with the right end of the rack housing 13 is a position at which the steering wheel 3 can be maximally steered to the left side, and this position corresponds to a rack end position which is a left end position.

The EPS actuator 6 includes a motor 21 which is a drive source and a reduction gear mechanism 22 such as a worm and wheel. The motor 21 is connected to the column shaft 15 via the reduction gear mechanism 22. The EPS actuator 6 applies a motor torque as an assist force to the steering mechanism 5 by reducing rotation of the motor 21 using the reduction gear mechanism 22 and transmitting the reduced rotation to the column shaft 15. A three-phase brushless motor is employed as the motor 21 according to this embodiment.

The steering control device 1 is connected to the motor 21 and controls the operation thereof. The steering control device 1 includes a central processing unit (CPU), an electronic control unit (ECU) and a memory which are not illustrated and the CPU or the ECU executes a program stored in the memory every predetermined calculation cycle. Accordingly, various types of control are performed.

A vehicle speed sensor 31 that detects a vehicle speed SPD of the vehicle and a torque sensor 32 that detects a steering torque Th which is applied to the steering shaft 11 according to a driver's steering are connected to the steering control device 1. A rotation sensor 33 that detects a rotation angle $\theta m$ of the motor 21 as a relative angle in a range of 360° is connected to the steering control device 1. The steering torque Th and the rotation angle $\theta m$ are detected as positive values when the steering wheel 3 is steered to the right side and are detected as negative values when the steering wheel 3 is steered to the left side. The steering control device 1 controls the operation of the EPS actuator 6, that is, an assist force which is applied to the steering mechanism 5 such that the rack shaft 12 can move to reciprocate, by supplying drive power to the motor 21 based on signals indicating state quantities which are input from the sensors.

Figure 2:
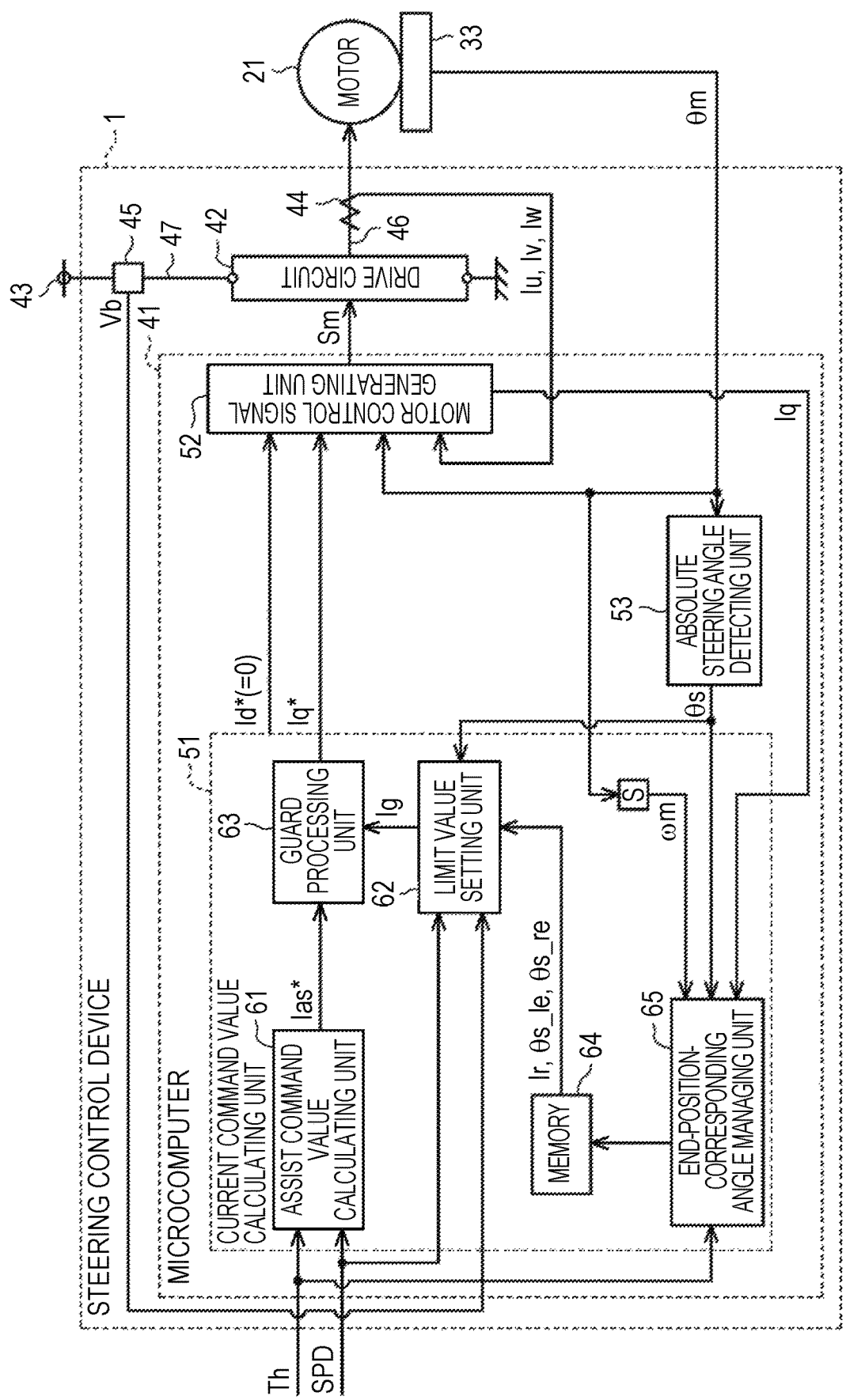
FIG. 2 is a block diagram illustrating a steering control device according to the first embodiment.

The configuration of the steering control device 1 will be described below. As illustrated in FIG. 2, the steering control device 1 includes a microcomputer 41 which is a motor control unit that outputs a motor control signal Sm and a drive circuit 42 that supplies drive power to the motor 21 based on the motor control signal Sm. A known Pulse Width Modulation (PWM) inverter including a plurality of switching elements such as FETs is employed as the drive circuit 42 according to this embodiment. The motor control signal Sm output from the microcomputer 41 defines ON and OFF states of the switching elements. Accordingly, the switching elements are turned on and off in response to the motor control signal Sm and a power supply pattern to a motor coil is switched in phases, whereby DC power of an onboard power supply 43 is converted into three-phase drive power and is output to the motor 21.

Control blocks which will be described below are realized by a computer program which is executed by the microcomputer 41, state quantities are detected every predetermined sampling cycle, and calculation processes assigned to the following control blocks are performed every predetermined calculation cycle.

The vehicle speed SPD, the steering torque Th, and the rotation angle $\theta m$ of the motor 21 are input to the microcomputer 41. Phase current values Iu, Iv, and Iw of the motor 21 which are detected by a current sensor 44 and a source voltage Vb of the onboard power supply 43 which is detected by a voltage sensor 45 are also input to the microcomputer 41. The current sensor 44 is provided in a connection line 46 between the drive circuit 42 and the motor coil of each phase. The voltage sensor 45 is provided in a connection line 47 between the onboard power supply 43 and the drive circuit 42. In FIG. 2, for the purpose of convenience of description, one of each of the current sensors 44 of the phases and the connection lines 46 of the phases is illustrated. The microcomputer 41 outputs a motor control signal Sm based on the input state quantities.

Specifically, the microcomputer 41 includes a current command value calculating unit 51 that calculates current command values Id* and Iq*, a motor control signal generating unit 52 that outputs a motor control signal Sm based on the current command values Id* and Iq*, and an absolute steering angle detecting unit 53 that detects an absolute steering angle θs.

The steering torque Th, the vehicle speed SPD, and the absolute steering angle θs are input to the current command value calculating unit 51. The current command value calculating unit 51 calculates the current command values Id* and Iq* based on the input state quantities. The current command values Id* and Iq* are target values of currents to be supplied to the motor 21 and are a current command value on a d axis and a current command value on a q axis, respectively, in a d/q coordinate system. Among these, the q-axis current command value Iq* represents a target value of a motor torque which is output from the motor 21. In this embodiment, the d-axis current command value Id* is basically fixed to zero. For example, the current command values Id* and Iq* have positive values when steering to the right side is assisted with and have negative values when steering to the left side is assisted with.

The current command values Id* and Iq*, the phase current values Iu, Iv, and Iw, and the rotation angle θm of the motor 21 are input to the motor control signal generating unit 52. The motor control signal generating unit 52 generates the motor control signal Sm by performing current feedback control in the d/q coordinate system based on the input state quantities.

Specifically, the motor control signal generating unit 52 calculates a d-axis current value Id and a q-axis current value Iq which are actual current values of the motor 21 in the d/q coordinate system by mapping the phase current values Iu, Iv, and Iw onto the d/q coordinate system based on the rotation angle θm. Then, the motor control signal generating unit 52 generates the motor control signal Sm by performing current feedback control such that the d-axis current value Id follows the d-axis current command value Id* and the q-axis current value Iq follows the q-axis current command value Iq*. The q-axis current value Iq which is calculated in the process of generating the motor control signal Sm is output to the end-position-corresponding angle managing unit 65.

The motor control signal generating unit 52 outputs the generated motor control signal Sm to the drive circuit 42. Accordingly, by supplying drive power based on the motor control signal Sm to the motor 21 and outputting a motor torque based on the q-axis current command value Iq* from the motor 21, an assist force is applied to the steering mechanism 5.

The rotation angle θm is input to the absolute steering angle detecting unit 53. The absolute steering angle detecting unit 53 detects an absolute motor angle which is expressed as an absolute angle including a range exceeding 360° based on the rotation angle θm. The absolute steering angle detecting unit 53 in this embodiment integrates a rotation speed of the motor 21, for example, with an origin at the rotation angle θm when a start switch such as an ignition switch is turned on for the first time after the onboard power supply 43 has been replaced, and detects an absolute motor angle based on the integrated rotation speed and the rotation angle θm. Then, the absolute steering angle detecting unit 53 detects an absolute steering angle θs indicating a steering angle of the steering shaft 11 by multiplying the absolute motor angle by a conversion factor based on a reduction gear ratio of the reduction gear mechanism 22. In the steering control device 1 according to this embodiment, rotation of the motor 21 is monitored even when the start switch is turned off, and the rotation speed of the motor 21 is integrated normally. Accordingly, even when the start switch is turned on a second time or later after the onboard power supply 43 has been replaced, the origin of the absolute steering angle θs is the same as the origin which was set when the start switch was turned on for the first time.

Since the turning angle of the turning wheels 4 is changed by the rotation of the steering shaft 11 as described above, the absolute steering angle θs indicates a rotation angle of a rotation shaft which can be converted to the turning angle of the turning wheels 4. The absolute motor angle and the absolute steering angle θs have positive values when they are angles turned to the right side from the origin and have negative values when they are angles turned to the left side from the origin.

The configuration of the current command value calculating unit 51 will be described below. The current command value calculating unit 51 includes an assist command value calculating unit 61 that calculates an assist command value Ias* which is a base component of the q-axis current command value Iq*, a limit value setting unit 62 that sets a limit value Ig which is an upper limit of the absolute value of the q-axis current command value Iq*, and a guard processing unit 63 that limits the absolute value of the assist command value Ias* to being equal to or less than the limit value Ig. The current command value calculating unit 51 further includes an end-position-corresponding angle managing unit 65 that manages end-position-corresponding angles θs_re and θs_le which are the absolute steering angle θs corresponding to right and left rack end positions and which are stored in a memory 64.

The steering torque Th and the vehicle speed SPD are input to the assist command value calculating unit 61. The assist command value calculating unit 61 calculates the assist command value Ias* based on the steering torque Th and the vehicle speed SPD. Specifically, the assist command value calculating unit 61 calculates the assist command value Ias* to have a larger absolute value as the absolute value of the steering torque Th becomes greater and as the vehicle speed SPD becomes lower. The calculated assist command value Ias* is output to the guard processing unit 63.

The limit value Ig set by the limit value setting unit 62 in addition to the assist command value Ias* is input to the guard processing unit 63 as will be described later. When the absolute value of the input assist command value Ias* is equal to or less than the limit value Ig, the guard processing unit 63 outputs the value of the assist command value Ias* to the motor control signal generating unit 52 as the q-axis current command value Iq* without any change. On the other hand, when the absolute value of the input assist command value Ias* is greater than the limit value Ig, the guard processing unit 63 outputs a value obtained by limiting the absolute value of the assist command value Ias* to the limit value Ig to the motor control signal generating unit 52 as the q-axis current command value Iq*.

The rated current Ir which is a maximum current corresponding to a torque set in advance as a motor torque which can be output from the motor 21, end-position-corresponding angles θs_re and θs_le, and the like are stored in the memory 64. The end-position-corresponding angle θs_le on the left side is the absolute steering angle θs corresponding to the left rack end position, and the end-position-corresponding angle θs_re on the right side is the absolute steering angle θs corresponding to the right rack end position. Setting and update of the end-position-corresponding angles θs_re and θs_le are managed by the end-position-corresponding angle managing unit 65 as will be described later. For example, a memory of a type that maintains the end-position-corresponding angles θs_re and θs_le as long as the onboard power supply 43 is not detached is used as the memory 64 in this embodiment.

The configuration of the limit value setting unit 62 will be described below. The absolute steering angle θs, the vehicle speed SPD, the source voltage Vb, the rated current Ir, and the end-position-corresponding angles θs_re and θs_le are input to the limit value setting unit 62. The limit value setting unit 62 sets the limit value Ig based on the input state quantities.

Figure 3:
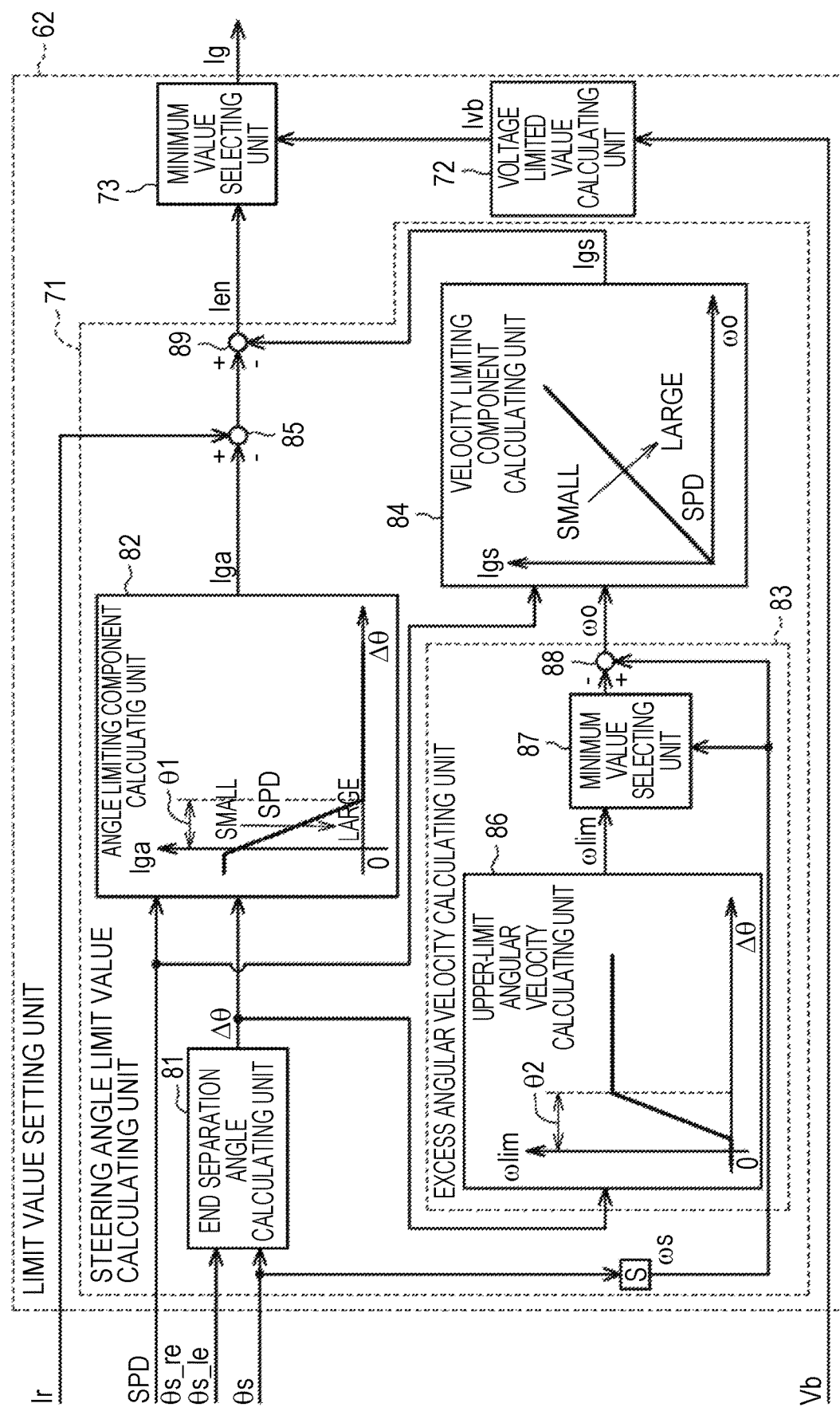
FIG. 3 is a block diagram illustrating a limit value setting unit according to the first embodiment.

Specifically, as illustrated in FIG. 3, the limit value setting unit 62 includes a steering angle limit value calculating unit 71 that calculates a steering angle limit value Ien based on the absolute steering angle θs, a voltage limit value calculating unit 72 that calculates a voltage limit value Ivb which is another limit value based on the source voltage Vb, and a minimum value selecting unit 73 that selects the smaller of the steering angle limit value Ien and the voltage limit value Ivb.

The absolute steering angle θs, the vehicle speed SPD, the rated current Ir, and the end-position-corresponding angles θs_re and θs_le are input to the steering angle limit value calculating unit 71. The steering angle limit value calculating unit 71 calculates the steering angle limit value Ien which decreases with a decrease of an end separation angle Δθ indicating a minimum distance of the absolute steering angle θs from the end-position-corresponding angles θs_re and θs_le on the right and left sides based on the input state quantities when the end separation angle Δθ is equal to or less than a predetermined angle θ1 as will be described later. The calculated steering angle limit value Ien is output to the minimum value selecting unit 73. The steering angle limit value calculating unit 71 does not calculate the steering angle limit value Ien when none of the end-position-corresponding angles θs_re and θs_le on the right and left sides is set in the memory 64.

The source voltage Vb is input to the voltage limit value calculating unit 72. The voltage limit value calculating unit 72 calculates the voltage limit value Ivb as being less than a rated voltage for supplying the rated current Ir when the absolute value of the source voltage Vb is equal to or less than a preset voltage threshold value Vth. Specifically, when the absolute value of the source voltage Vb is equal to or less than the voltage threshold value Vth, the voltage limit value calculating unit 72 calculates the voltage limit value Ivb having a decreasing absolute value with a decrease of the absolute value of the source voltage Vb. The calculated voltage limit value Ivb is output to the minimum value selecting unit 73.

The minimum value selecting unit 73 selects the smaller of the input steering angle limit value Ien and the input voltage limit value Ivb as the limit value Ig and outputs the selected one to the guard processing unit 63. By outputting the steering angle limit value Ien to the guard processing unit 63 as the limit value Ig, the absolute value of the q-axis current command value Iq* is limited to the steering angle limit value Ien. Accordingly, end contact relaxation control for relaxing an impact of an end contact is performed by decreasing the absolute value of the q-axis current command value Iq* with the decrease of the end separation angle Δθ when the end separation angle Δθ is equal to or less than the predetermined angle θ1. As will be described later, regular end contact relaxation control is performed when both of the end-position-corresponding angles θs_re and θs_le on the right and left sides are stored in the memory 64, and temporary end contact relaxation control is performed when one of the end-position-corresponding angles θs_re and θs_le on the right and left sides is stored in the memory 64.

By outputting the voltage limit value Ivb as the limit value Ig to the guard processing unit 63, the absolute value of the q-axis current command value Iq* is limited to the voltage limit value Ivb. Accordingly, when the absolute value of the source voltage Vb is equal to or less than the voltage threshold value Vth, power supply protection control for decreasing the absolute value of the q-axis current command value Iq* with the decrease of the absolute value of the source voltage Vb is performed.

The configuration of the steering angle limit value calculating unit 71 will be described below. The steering angle limit value calculating unit 71 includes an end separation angle calculating unit 81 that calculates the end separation angle Δθ and an angle limiting component calculating unit 82 that calculates an angle limiting component Iga which is a current limit which is determined based on the end separation angle Δθ. The steering angle limit value calculating unit 71 includes an excess angular velocity calculating unit 83 that calculates an excess angular velocity ωo which is an excess of a steering angular velocity ωs with respect to an upper-limit angular velocity ωlim and a velocity limiting component calculating unit 84 that calculates a velocity limiting component Igs which is a current limit which is determined based on the excess angular velocity ω.

Specifically, the absolute steering angle θs and the end position-corresponding angles θs_re and θs_le are input to the end separation angle calculating unit 81. When both of the end-position-corresponding angles θs_re and θs_le on the right and left sides are stored in the memory 64, the end separation angle calculating unit 81 calculates a difference between the absolute steering angle θs and the end-position-corresponding angle θs_le on the left side in the newest calculation cycle and a difference between the absolute steering angle θs and the end-position-corresponding angle θs_re on the right side in the newest calculation cycle. Then, the end separation angle calculating unit 81 outputs the smaller absolute value of the calculated differences as the end separation angle Δθ to the angle limiting component calculating unit 82 and the excess angular velocity calculating unit 83. On the other hand, when only one of the end-position-corresponding angles θs_re and θs_le on the right and left sides is stored in the memory 64, the end separation angle calculating unit 81 calculates a difference between the absolute steering angle θs and the end-position-corresponding angle θs_le in the newest calculation cycle or a difference between the absolute steering angle θs and the end-position-corresponding angle θs_re in the newest calculation cycle. Then, the end separation angle calculating unit 81 outputs the calculated difference as the end separation angle Δθ to the angle limiting component calculating unit 82 and the excess angular velocity calculating unit 83.

The end separation angle calculating unit 81 does not calculate the end separation angle Δθ when none of the end-position-corresponding angles θs_re and θs_le on the right and left sides is stored in the memory 64. Accordingly, in the angle limiting component calculating unit 82 and the excess angular velocity calculating unit 83 which will be described later, the angle limiting component Iga and the excess angular velocity ωo are not calculated and the steering angle limit value Ien is not calculated.

The end separation angle Δθ and the vehicle speed SPD are input to the angle limiting component calculating unit 82. The angle limiting component calculating unit 82 includes a map in which a relationship between the end separation angle Δθ and the vehicle speed SPD and the angle limiting component Iga is defined and calculates the angle limiting component Iga corresponding to the end separation angle Δθ and the vehicle speed SPD with reference to the map.

In this map, the angle limiting component Iga is set to decrease as the end separation angle Δθ increases from a zero state, to reach zero when the end separation angle Δθ is a predetermined angle θ1, and to be zero when the end separation angle Δθ is greater than the predetermined angle θ1. In this map, an area in which the end separation angle Δθ is negative is also set, and the angle limiting component Iga increases in proportion to a decrease of the end separation angle Δθ when the end separation angle Δθ becomes less than zero and is kept constant after the angle limiting component Iga becomes the rated current Ir. The negative area in the map is assumed to be a degree by which the motor 21 rotates with elastic deformation of the EPS 2 by performing more turning steering in a state in which the rack end 18 comes into contact with the rack housing 13. The predetermined angle θ1 is set to a small angle indicating a range close to the end-position-corresponding angles θs_re and θs_le. That is, the angle limiting component Iga is set to decrease when the absolute steering angle θs transitions from the end-position-corresponding angles θs_re and θs_le to the neutral steering position and to be zero when the absolute steering angle θs is located closer to the neutral steering position than to the vicinities of the end-position-corresponding angles θs_re and θs_le.

In this map, the angle limiting component Iga is set to decrease with an increase of the vehicle speed SPD in an area in which the end separation angle Δθ is equal to or less than the predetermined angle θ1. Specifically, the angle limiting component Iga is set to be greater than zero when the vehicle speed SPD is in a low-speed area, and the angle limiting component Iga is set to be zero when the vehicle speed SPD is in a middle-speed or high-speed area. The calculated angle limiting component Iga is output to a subtractor 85.

A steering angular velocity ωs obtained by differentiating the end separation angle Δθ and the absolute steering angle θs is input to the excess angular velocity calculating unit 83. The excess angular velocity calculating unit 83 calculates the excess angular velocity ωo based on the input state quantities.

Specifically, the excess angular velocity calculating unit 83 includes an upper-limit angular velocity calculating unit 86 that calculates an upper-limit angular velocity ωlim. The end separation angle Δθ is input to the upper-limit angular velocity calculating unit 86. The upper-limit angular velocity calculating unit 86 includes a map in which a relationship between the end separation angle Δθ and the upper-limit angular velocity ωlim is defined, and calculates the upper-limit angular velocity ωlim corresponding to the end separation angle Δθ with reference to the map.

In this map, the upper-limit angular velocity ωlim is set such that the upper-limit angular velocity ωlim is a minimum when the end separation angle Δθ has a value close to zero and greater than zero and the upper-limit angular velocity ωlim increases in proportion to the increase of the end separation angle Δθ. The upper-limit angular velocity ωlim is set to be fixed to a value which is set in advance as a maximum angular velocity at which the motor 21 can rotate when the end separation angle Δθ becomes greater than a predetermined angle θ2. The predetermined angle θ2 is set to an angle greater than the predetermined angle θ1.

When the absolute value of the steering angular velocity ωs is greater than the upper-limit angular velocity ωlim corresponding to the end separation angle Δθ, the excess angular velocity calculating unit 83 outputs an excess of the steering angular velocity ωs from the upper-limit angular velocity ωlim as an excess angular velocity ω to the velocity limiting component calculating unit 84. On the other hand, when the absolute value of the steering angular velocity ωs is equal to or less than the upper-limit angular velocity ωlim, the excess angular velocity calculating unit 83 outputs an excess angular velocity ω indicating zero to the velocity limiting component calculating unit 84.

Specifically, the excess angular velocity calculating unit 83 includes a minimum value selecting unit 87 to which the upper-limit angular velocity ωlim and the steering angular velocity ωs are input. The minimum value selecting unit 87 selects the less of the upper-limit angular velocity ωlim and the steering angular velocity ωs and outputs the selected value to a subtractor 88. The excess angular velocity calculating unit 83 calculates an excess angular velocity ω by subtracting the output value of the minimum value selecting unit 87 from the absolute value of the steering angular velocity ωs in the subtractor 88. In this way, by causing the minimum value selecting unit 87 to select the smaller of the upper-limit angular velocity ωlim and the absolute value of the steering angular velocity ωs, the steering angular velocity ωs is subtracted from the steering angular velocity ωs in the subtractor 88 and thus the excess angular velocity ω is zero when the steering angular velocity ωs is equal to or less than the upper-limit angular velocity ωlim. On the other hand, when the steering angular velocity ωs is greater than the upper-limit angular velocity ωlim, the upper-limit angular velocity ωlim is subtracted from the absolute value of the steering angular velocity ωs in the subtractor 88 and thus the excess angular velocity ω is an excess of the steering angular velocity ωs from the upper-limit angular velocity ωlim.

The excess angular velocity ω and the vehicle speed SPD are input to the velocity limiting component calculating unit 84. The velocity limiting component calculating unit 84 includes a map in which a relationship between the excess angular velocity ω and the vehicle speed SPD and the velocity limiting component Igs is defined and calculates the velocity limiting component Igs based on the excess angular velocity ω and the vehicle speed SPD with reference to the map.

In this map, the velocity limiting component Igs is set such that the velocity limiting component Igs is the least when the excess angular velocity ω is zero and the velocity limiting component Igs increases in proportion to an increase of the excess angular velocity ω. In this map, the velocity limiting component Igs is set to decrease with the increase of the vehicle speed SPD. In this map, the absolute value of the velocity limiting component Igs is set to be less than the absolute value of the angle limiting component Iga. The calculated velocity limiting component Igs is output to a subtractor 89.

A rated current Ir is input to the subtractor 85 to which the angle limiting component Iga is input. The steering angle limit value calculating unit 71 outputs a value obtained by subtracting the angle limiting component Iga from the rated current Ir in the subtractor 85 to the subtractor 89 to which the velocity limiting component Igs is input. Then, the steering angle limit value calculating unit 71 outputs a value obtained by subtracting the velocity limiting component Igs from the output value of the subtractor 85, that is, a value obtained by subtracting the angle limiting component Iga and the velocity limiting component Igs from the rated current Ir, in the subtractor 89 as the steering angle limit value Ien to the minimum value selecting unit 73.

The configuration of the end-position-corresponding angle managing unit 65 will be described below. As illustrated in FIG. 2, the steering torque Th, the absolute steering angle θs, and a motor angular velocity ωm obtained by differentiating the rotation angle θm are input to the end-position-corresponding angle managing unit 65. The end-position-corresponding angle managing unit 65 manages storage and update of the end-position-corresponding angles θs_re and θs_le in the memory 64 based on the input state quantities.

The end-position-corresponding angle managing unit 65 mainly performs two following processes. (1) The end-position-corresponding angles θs_re and θs_le are newly stored in the memory 64 to include update thereof. (2) It is determined whether the end-position-corresponding angles θs_re and θs_le stored in the memory 64 is to be updated. In both the processes (1) and (2), the end-position-corresponding angle managing unit 65 determines whether movement of the rack shaft 12 to one of the right and left sides has been limited, and acquires a plurality of absolute steering angles θs when it is determined that movement of the rack shaft 12 has been limited as limit position determination angles θi (where i is a natural number). Then, the end-position-corresponding angle managing unit 65 performs the processes (1) and (2) based on the plurality of limit position determination angles θi.

First, in the process (1), when the limit position determination angles θi on the right and left sides are acquired, the end-position-corresponding angle managing unit 65 stores the end-position-corresponding angles θs_re and θs_le in the memory 64 based on the limit position determination angles θi on the right and left sides.

On the other hand, when a plurality of limit position determination angles θi on only one of the right and left sides is acquired, the end-position-corresponding angle managing unit 65 stores the end-position-corresponding angles θs_re or θs_le on the right or left side in the memory 64 based on the plurality of limit position determination angles θi on the right or left side. In this process, as will be described later, the end-position-corresponding angle managing unit 65 determines whether the limit position determination angles θi are data acquired when movement of the rack shaft 12 has been limited by an end contact based on the variance of the plurality of limit position determination angles θi on the right or left side. Then, the end-position-corresponding angle managing unit 65 stores an angle based on end contact determination data D1 and D2 including the plurality of limit position determination angles θi on the right or left side when movement of the rack shaft 12 has been limited by an end contact as the end-position-corresponding angle θs_re on the right side or the end-position-corresponding angle θs_le on the left side in the memory 64.

In the process (2), the end-position-corresponding angle managing unit 65 acquires a plurality of limit position determination angles θi on the right or left side and determines whether the limit position determination angles θi on the right or left side are data acquired when movement of the rack shaft 12 has been limited by an end contact based on a variance of the plurality of limit position determination angles θi. When the plurality of limit position determination angles θi is data acquired when movement of the rack shaft 12 has been limited by an end contact, the end-position-corresponding angle managing unit 65 permits update of the end-position-corresponding angles θs_re and θs_le. On the other hand, when the plurality of limit position determination angles θi is not data acquired when movement of the rack shaft 12 has been limited by an end contact, the end-position-corresponding angle managing unit 65 does not permit update of the end-position-corresponding angles θs_re and θs_le. When the plurality of limit position determination angles θi is data acquired when movement of the rack shaft 12 has been limited by an end contact and end contact relaxation control is normally performed, the end-position-corresponding angle managing unit 65 does not permit update of the end-position-corresponding angles θs_re and θs_le.

Figure 4:
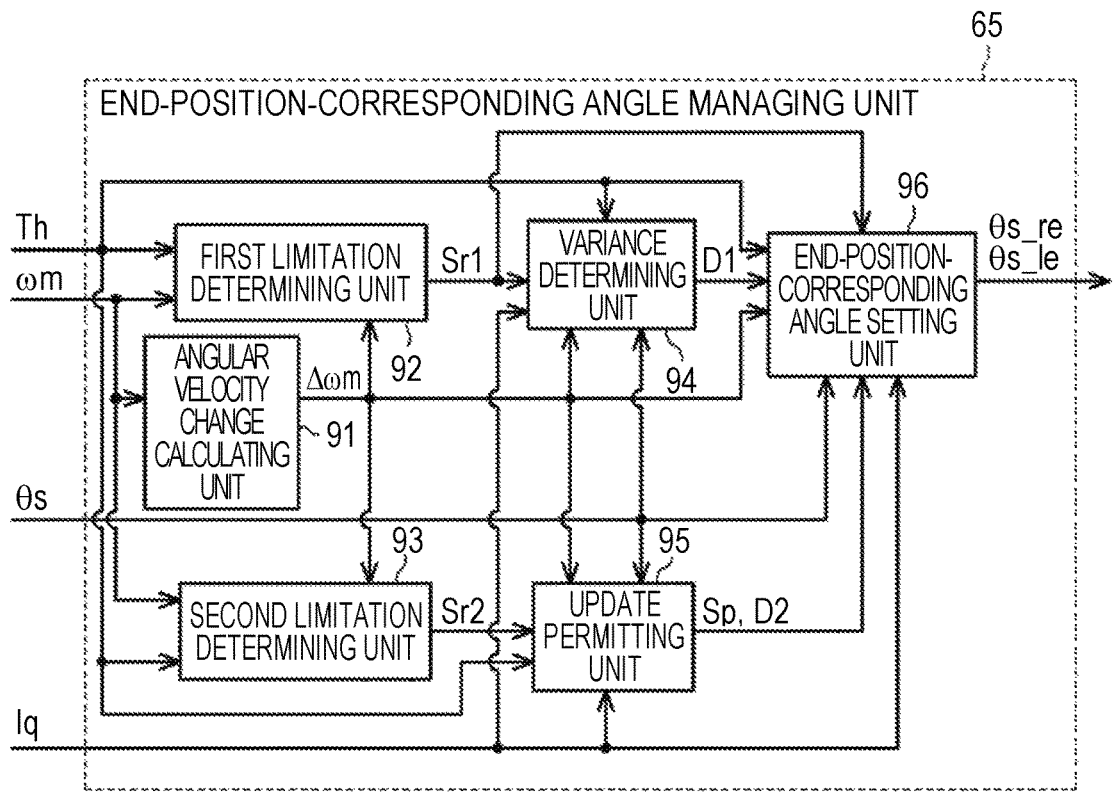
FIG. 4 is a block diagram illustrating an end-position-corresponding angle managing unit according to the first embodiment.

Specifically, as illustrated in FIG. 4, the end-position-corresponding angle managing unit 65 includes an angular velocity change calculating unit 91, a first limitation determining unit 92, a second limitation determining unit 93, a variance determining unit 94, an update permitting unit 95, and an end-position-corresponding angle setting unit 96. These control blocks will be sequentially described below.

Angular Velocity Change Calculating Unit 91

The motor angular velocity ωm is input to the angular velocity change calculating unit 91. The angular velocity change calculating unit 91 calculates an angular velocity change Δωm which is a change of the motor angular velocity ωm based on the input motor angular velocity ωm. Then, the angular velocity change calculating unit 91 outputs the angular velocity change Δωm to the first limitation determining unit 92 and the second limitation determining unit 93. The angular velocity change calculating unit 91 in this embodiment outputs a result of the angular velocity change Δωm having been subjected to a low-pass filtering process to the first limitation determining unit 92 and the second limitation determining unit 93.

First Limitation Determining Unit 92

The steering torque Th, the motor angular velocity ωm, and the angular velocity change Δωm are input to the first limitation determining unit 92. The first limitation determining unit 92 determines whether movement of the rack shaft 12 to one of the right and left sides has been limited by performing two determinations including dynamic limitation determination and static limitation determination in parallel or continuously based on the input state quantities. The static limitation determination is determination of detecting a state in which turning steering is performed with movement of the rack shaft 12 limited and a state in which movement of the rack shaft 12 has been limited by slowing performing turning steering. The dynamic limitation determination is determination of detecting a state in which turning steering is performed at a relatively high speed and return steering is performed immediately after movement of the rack shaft 12 has been limited.

When three following conditions are satisfied, the first limitation determining unit 92 determines that dynamic limitation determination is established and movement of the rack shaft 12 has been limited. (a1) The absolute value of the steering torque Th is equal to or greater than a first steering torque threshold value Tth1. (a2) The sign of the motor angular velocity ωm is the same as the sign of the steering torque Th and the absolute value of the motor angular velocity ωm is greater than a first angular velocity threshold value ωth1. (a3) The sign of the angular velocity change Δωm is opposite to the sign of the steering torque Th and the absolute value of the angular velocity change Δωm is greater than a first angular velocity change threshold value Δωth1.

The first steering torque threshold value Tth1 is a steering torque when return steering is performed immediately after the rack end 18 has come into contact with the rack housing 13 and is set to an appropriate value which is greater than zero. The first angular velocity threshold value ωth1 is an angular velocity indicating that the motor 21 stops and is set to substantially zero. The first angular velocity change threshold value Δωth1 is an angular velocity change indicating that the motor 21 decelerates rapidly and is set to a relatively great value.

Figure 5:
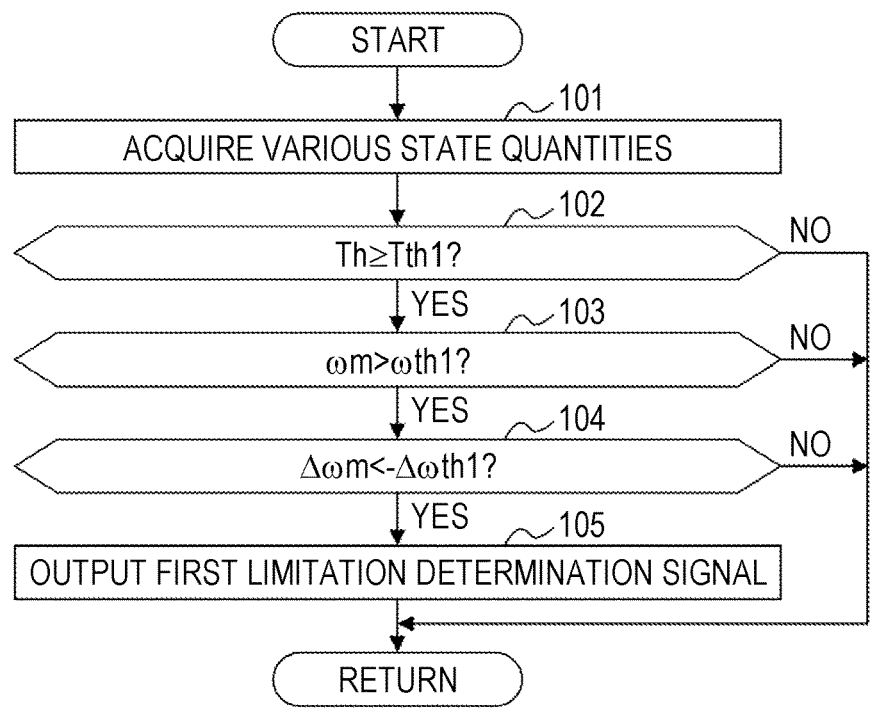
FIG. 5 is a flowchart illustrating a static limitation determining process routine which is performed by a first limitation determining unit according to the first embodiment.

An example of a dynamic limitation determining process routine which is performed by the first limitation determining unit 92 will be described below with reference to the flowchart illustrated in FIG. 5. In the following description, for the purpose of convenience of description, it is assumed that the rack shaft 12 moves to the right side and right limit position determination angles θi are acquired, but the same process is also performed when the rack shaft 12 moves to the left side and left limit position determination angles θi are acquired.

Specifically, when various state quantities are acquired (Step 101), the first limitation determining unit 92 determines whether the steering torque Th is equal to or greater than the first steering torque threshold value Tth1 (Step 102). When the steering torque Th is equal to or greater than the first steering torque threshold value Tth1 (Step 102: YES), it is determined whether the motor angular velocity ωm is greater than the first angular velocity threshold value ωth1 (Step 103). That is, in Step 103, it is determined whether the sign of the motor angular velocity ωm is the same as the sign of the steering torque Th and the absolute value of the motor angular velocity ωm is greater than the first angular velocity threshold value ωth1. When the motor angular velocity ωm is greater than the first angular velocity threshold value ωth1 (Step 103: YES), it is determined whether the angular velocity change Δωm is less than the negative first angular velocity change threshold value Δωth1 (Step 104). That is, in Step 104, it is determined whether the sign of the angular velocity change Δωm is opposite to the sign of the steering torque Th and the absolute value of the angular velocity change Δωm is greater than the first angular velocity change threshold value Δωth1. When the angular velocity change Δωm is less than the negative first angular velocity change threshold value Δωth1 (Step 104: YES), it is determined that the dynamic limitation determination is established and movement of the rack shaft 12 has been limited, and a first limitation determination signal Sr1 indicating the determination result is output to the variance determining unit 94 (Step 105).

On the other hand, when the steering torque Th is less than the first steering torque threshold value Tth1 (Step 102: NO), when the motor angular velocity ωm is equal to or less than the first angular velocity threshold value ωth1 (Step 103: NO), and when the angular velocity change Δωm is equal to or greater than the negative first angular velocity change threshold value Δωth1 (Step 104: NO), processes subsequent thereto are not performed.

When three following conditions are satisfied, the first limitation determining unit 92 determines that static limitation determination is established and movement of the rack shaft 12 has been limited. (b1) The absolute value of the steering torque Th is equal to or greater than a second steering torque threshold value Tth2. (b2) The sign of the motor angular velocity ωm is the same as the sign of the steering torque Th and the absolute value of the motor angular velocity ωm is greater than the first angular velocity threshold value ωth1 and equal to or less than a second angular velocity threshold value ωth2. (b3) The absolute value of the angular velocity change Δωm is less than a second angular velocity change threshold value Δωth2. The second steering torque threshold value Tth2 is a steering torque which is required to steer the steering wheel 3 when the vehicle is turned in a state in which the rack end 18 is in contact with the rack housing 13 and is set to an appropriate value which is greater than the first steering torque threshold value Tth1. The second angular velocity threshold value ωth2 is an angular velocity indicating that the motor 21 rotates at a low speed and is set to an appropriate value which is greater than zero. The second angular velocity change threshold value Δωth2 is an angular velocity change indicating that the motor 21 does not substantially accelerate or decelerate and is set to a value which is less than the first angular velocity change threshold value Δωth1 and slightly greater than zero.

Figure 6:
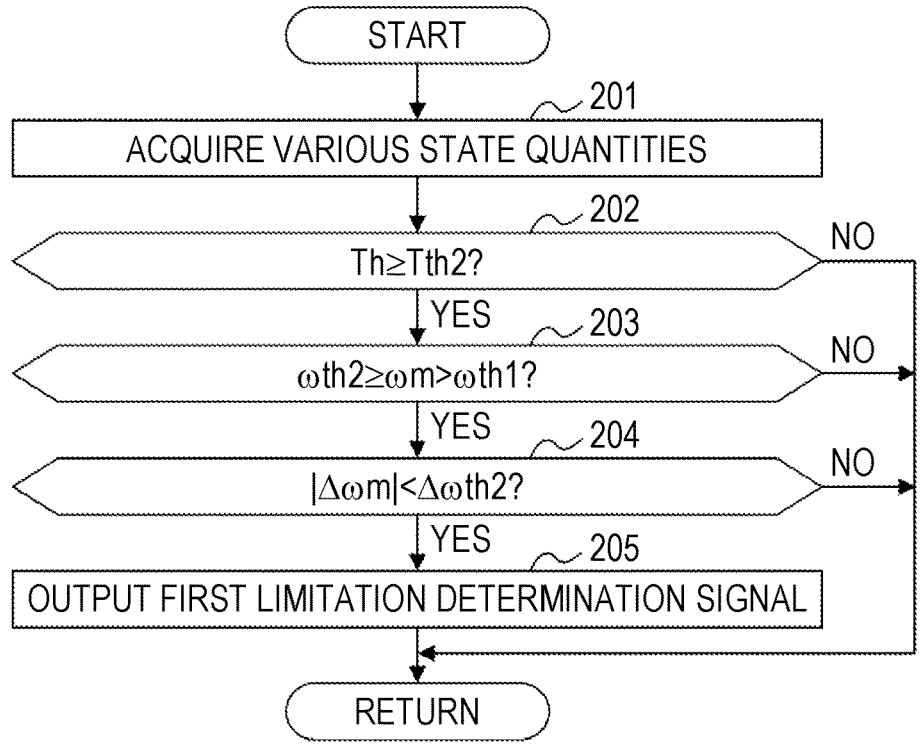
FIG. 6 is a flowchart illustrating a dynamic limitation determining process routine which is performed by the first limitation determining unit according to the first embodiment.

An example of a static limitation determining process routine which is performed by the first limitation determining unit 92 will be described below with reference to the flowchart illustrated in FIG. 6. In the following description, for the purpose of convenience of description, it is assumed that the rack shaft 12 moves to the right side and right limit position determination angles θi are acquired, but the same process is also performed when the rack shaft 12 moves to the left side and left limit position determination angles θi are acquired.

Specifically, when various state quantities are acquired (Step 201), the first limitation determining unit 92 determines whether the steering torque Th is equal to or greater than the second steering torque threshold value Tth2 (Step 202). When the steering torque Th is equal to or greater than the second steering torque threshold value Tth2 (Step 202: YES), it is determined whether the motor angular velocity ωm is greater than the first angular velocity threshold value ωth1 and equal to or less than the second angular velocity threshold value ωth2 (Step 203). That is, in Step 203, it is determined whether the sign of the motor angular velocity ωm is the same as the sign of the steering torque Th and the absolute value of the motor angular velocity ωm is greater than the first angular velocity threshold value ωth1 and equal to or less than the second angular velocity threshold value ωth2. When the motor angular velocity ωm is greater than the first angular velocity threshold value ωth1 and equal to or less than the second angular velocity threshold value ωth2, that is, when the motor 21 rotates at a very low velocity (Step 203: YES), it is determined whether the absolute value of the angular velocity change Δωm is less than the second angular velocity change threshold value Δωth2 (Step 204). When the absolute value of the angular velocity change Δωm is less than the second angular velocity change threshold value Δωth2 (Step 204: YES), it is determined that the static limitation determination is established and movement of the rack shaft 12 has been limited, and a first limitation determination signal Sr1 indicating the determination result is output to the variance determining unit 94 (Step 205).

On the other hand, when the steering torque Th is less than the second steering torque threshold value Tth2 (Step 202: NO), when the motor angular velocity ωm is equal to or less than the first angular velocity threshold value ωth1 or greater than the second angular velocity threshold value ωth2 (Step 203: NO), and when the absolute value of the angular velocity change Δωm is equal to or greater than the second angular velocity change threshold value Δωth2 (Step 204: NO), processes subsequent thereto are not performed.

Second Limitation Determining Unit 93

As illustrated in FIG. 4, the steering torque Th, the motor angular velocity ωm, and the angular velocity change Δωm are input to the second limitation determining unit 93. The second limitation determining unit 93 determines whether movement of the rack shaft 12 to one of the right and left sides has been limited by an end contact or execution of end contact relaxation control by performing static limitation determination based on the input state quantities. The static limitation determination in the second limitation determining unit 93 is performed in the same process routine as the static limitation determination in the first limitation determining unit 92. When it is determined that movement of the rack shaft 12 has been limited by an end contact or execution of end contact relaxation control, the second limitation determining unit 93 outputs a second limitation determination signal Sr2 indicating the determination result to the update permitting unit 95.

Variance Determining Unit 94

The steering torque Th, the absolute steering angle θs, the q-axis current value Iq, the angular velocity change Δωm, and the first limitation determination signal Sr1 are input to the variance determining unit 94. The variance determining unit 94 acquires a plurality of limit position determination angles θi based on the absolute steering angle θs when the first limitation determining unit 92 determines that movement of the rack shaft 12 has been limited. The variance determining unit 94 in this embodiment performs rigidity compensation based on mechanical elastic deformation of the EPS 2 which is caused by a torque applied to the EPS 2 on the absolute steering angle θs when it is determined that movement of the rack shaft 12 has been limited, and acquires angles subjected to the rigidity compensation as the limit position determination angles θi. The variance determining unit 94 determines whether the angles are data acquired when movement of the rack shaft 12 has been limited by an end contact based on the variance of the plurality of limit position determination angles θi on the right or left side. When the plurality of limit position determination angles θi are data acquired when movement of the rack shaft 12 has been limited by an end contact, the variance determining unit 94 outputs end contact determination data D1 including the plurality of limit position determination angles θi to the end-position-corresponding angle setting unit 96.

First, rigidity compensation will be described below. The variance determining unit 94 acquires values obtained by subtracting mechanical elastic deformation caused in the EPS 2 from the absolute steering angle θs when it is determined that movement of the rack shaft 12 has been limited as the limit position determination angles θi.

Specifically, the variance determining unit 94 calculates a pinion shaft torque Tp which is a sum of torques applied to the EPS 2 when it is determined that movement of the rack shaft 12 has been limited. The pinion shaft torque Tp corresponds to an axial force acting on the rack shaft 12 and the variance determining unit 94 is an example of an axial force detecting unit. As expressed by Expression (1), the variance determining unit 94 in this embodiment calculates the pinion shaft torque Tp using the steering torque Th which is applied by a driver, a motor torque based on the q-axis current value Iq, and an inertial torque based on the angular velocity change Δωm of the motor 21.

$$Tp = Th + Iq \times Km + \Delta\omega m \times K\omega \quad (1)$$

"Km" denotes a coefficient which is determined by a motor constant of the motor 21, a reduction gear ratio and efficiency of the reduction gear mechanism 22, and the like. "Kω" denotes a coefficient which is determined by the inertial moment of the motor 21, a reduction gear ratio and efficiency of the reduction gear mechanism 22, and the like.

Figure 7:
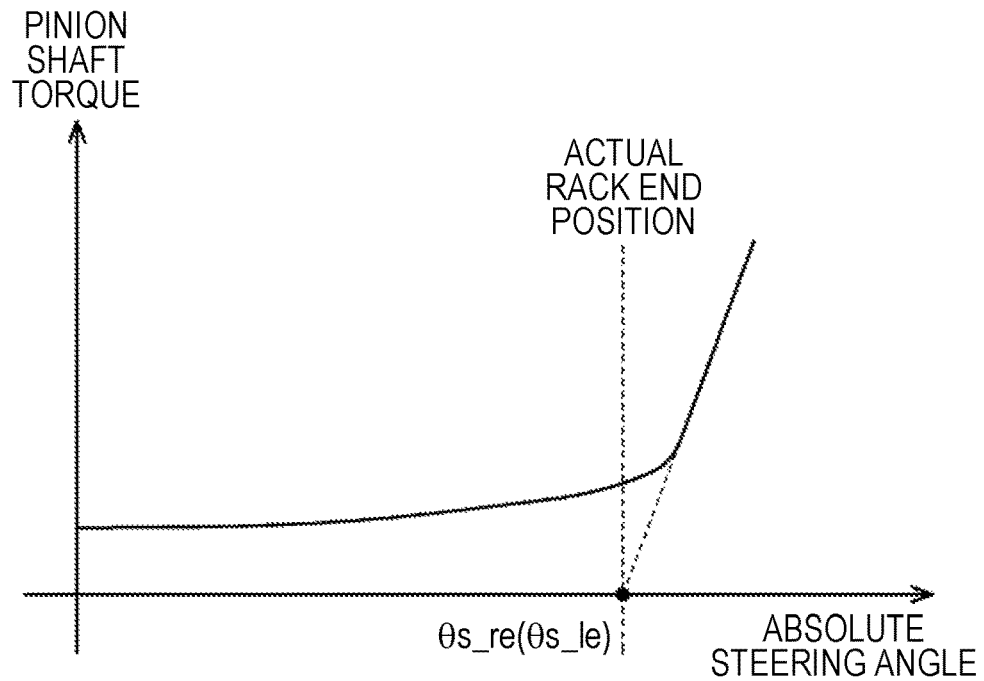
FIG. 7 is a diagram schematically illustrating a relationship between an absolute steering angle and a pinion shaft torque in the first embodiment.

As illustrated in FIG. 7, in general, when a steering operation is performed by a driver, the turning wheels 4 are turned and the absolute steering angle θs increases with the pinion shaft torque Tp applied to the EPS 2. At an angle slightly greater than the absolute steering angle θs corresponding to an actual rack end position, the absolute steering angle θs rarely increases even when the pinion shaft torque Tp increases. This is because, since movement of the rack shaft 12 has been limited by an end contact, the motor 21 only rotates slightly due to twist of the steering shaft 11 constituting the EPS 2 or mechanical elastic deformation such as compression of the rack shaft 12 with an increase of the pinion shaft torque Tp. Since the slope of the pinion shaft torque Tp with respect to the absolute steering angle θs is proportional to an elastic coefficient Ke of the EPS 2, the absolute steering angle θs at a position at which the pinion shaft torque Tp is zero along the slope with the absolute steering angle θs as a start point substantially corresponds to an actual rack end position.

Taking this point into consideration, the variance determining unit 94 calculates the rotation angle of the motor 21 based on an amount of elastic deformation of the EPS 2 by multiplying the pinion shaft torque Tp by the elastic coefficient Ke of the EPS 2. The variance determining unit 94 acquires values obtained by subtracting the rotation angle from the absolute steering angle θs when it is determined that movement of the rack shaft 12 has been limited as the limit position determination angles θi.

Determination of whether a plurality of limit position determination angles θi on the right or left side is data acquired when movement of the rack shaft 12 has been limited by an end contact will be described below. In the following description, for the purpose of convenience of description, it is assumed that movement of the rack shaft 12 to the left side has been limited a plurality of times and a plurality of limit position determination angles θi on the left side is acquired, but the same process is performed even when a plurality of limit position determination angles θi on the right side is acquired.

The variance determining unit 94 acquires angles obtained by performing rigidity compensation on the absolute steering angle θs in the calculation cycle in which the first limitation determination signal Sr1 indicating that movement of the rack shaft 12 has been limited is input as the limit position determination angles θi. The variance determining unit 94 determines to which of the right and left sides movement of the rack shaft 12 has been limited based on the sign of the absolute steering angle θs. When a plurality of limit position determination angles θi on the left side is acquired, the variance determining unit 94 calculates a first determination variance value Vd1 which is a determination variance value used for determination using Expression (2) at the time of acquiring the limit position determination angles θi on the left side.

$$Vd1 = \frac{1}{n-1} \sum_{i=1}^{n} (\theta i - \theta ave)^2 \quad (2)$$

Here, "n" denotes the number of acquired limit position determination angles θi and is an integer equal to or greater than 2. That is, the variance determining unit 94 in this embodiment calculates the first determination variance value Vd1 when two or more limit position determination angles θi are acquired. Here, "i" is a natural number. "θave" denotes an average value of the acquired limit position determination angles θi.

Subsequently, the variance determining unit 94 calculates a first variance ratio Rd1 (Rd1=Vd1/Vm) which is a ratio of the first determination variance value Vd1 to a predetermined variance value Vm. The predetermined variance value Vm is a variance value which is calculated using Expression (2) by acquiring a plurality of limit position determination angles θi when movement of the rack shaft 12 is actually limited by an end contact in an environment in which contact of the rack end 18 with the rack housing 13 can be ascertained with naked eyes or the like.

For example, when movement of the rack shaft 12 has been limited due to contact with a curbstone or the like, the position of the rack shaft 12 changes depending on a situation when the turning wheels 4 come into contact with the curbstone and thus the magnitudes of the limit position determination angles θi are likely to vary. On the other hand, when movement of the rack shaft 12 has been limited by an end contact, the position of the rack shaft 12 is determined depending on the structure of the EPS 2 or the like and thus the magnitudes of the limit position determination angles θ are less likely to vary. Accordingly, when the variance of the plurality of limit position determination angles θi is relatively large, it is thought that movement of the rack shaft 12 has been limited due to contact with a curbstone or the like. On the other hand, when the variance of the plurality of limit position determination angles θi is relatively small, it is thought that movement of the rack shaft 12 has been limited due to an end contact.

Taking this point into consideration, the variance determining unit 94 compares the first variance ratio Rd1 with a variance threshold value Rthn which is set depending on an acquisition number n which is the number of acquired limit position determination angles θi. The variance threshold value Rthn is set to decrease as the acquisition number n increases in advance. When the first variance ratio Rd1 is equal to or less than the variance threshold value Rthn, the variance determining unit 94 determines that the plurality of limit position determination angles θi is data acquired when movement of the rack shaft 12 has been limited by an end contact and outputs end contact determination data D1 including the plurality of limit position determination angles θi to the end-position-corresponding angle setting unit 96.

On the other hand, when the first variance ratio Rd1 is greater than the variance threshold value Rthn, the variance determining unit 94 determines that the plurality of limit position determination angles θi are not data acquired when movement of the rack shaft 12 has been limited by an end contact and does not output end contact determination data D1 to the end-position-corresponding angle setting unit 96. When the number of continuous determinations that the plurality of limit position determination angles θi is not data acquired when movement of the rack shaft 12 has been limited by an end contact is greater than a preset upper limit, the variance determining unit 94 discards the acquired limit position determination angles θi and repeats the above process. The upper limit is set to, for example, "5."

Figure 8:
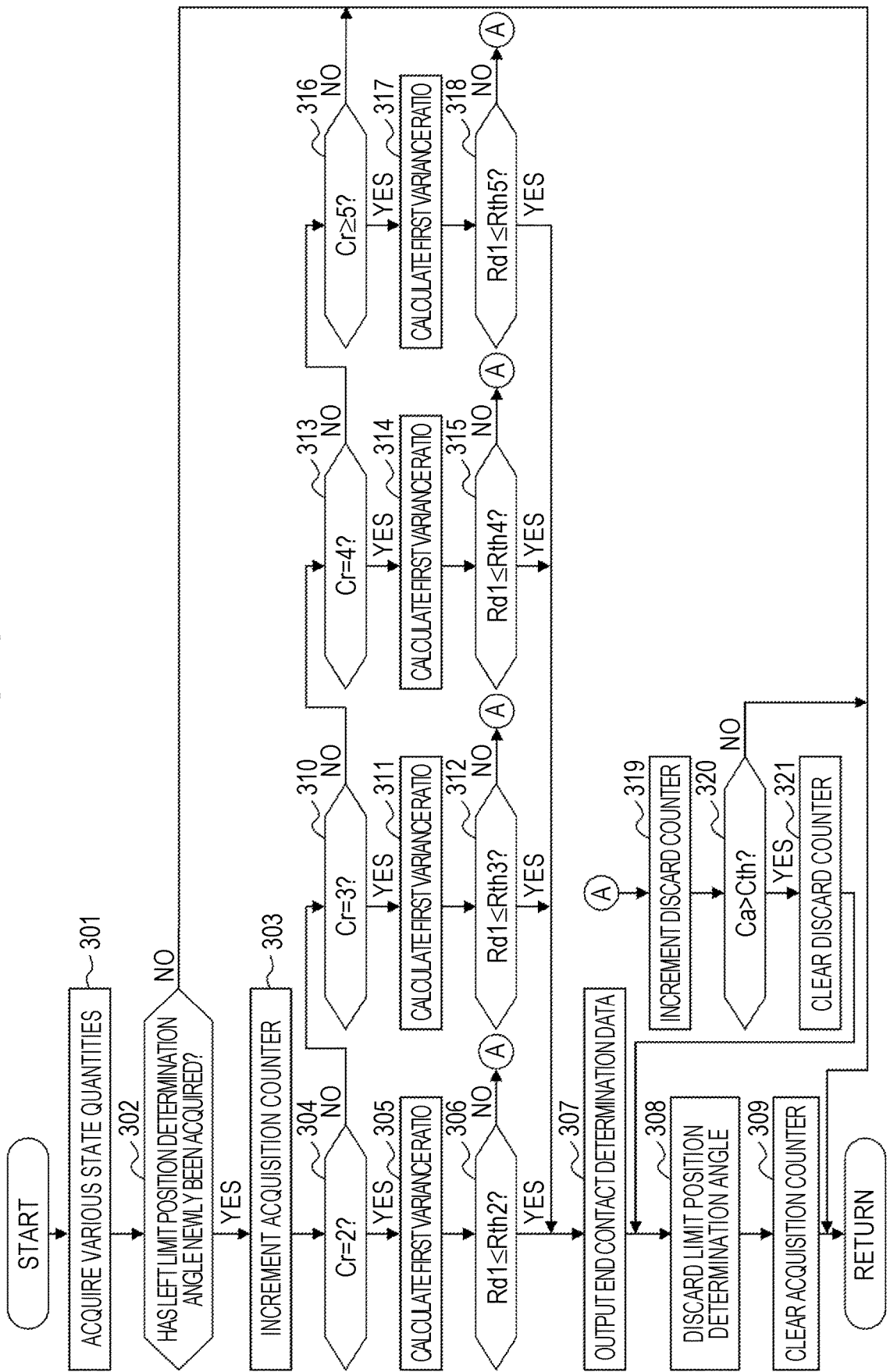
FIG. 8 is a flowchart illustrating an end contact determining process routine which is performed by a variance determining unit according to the first embodiment.

Specifically, as illustrated in the flowchart of FIG. 8, when various state quantities are acquired (Step 301), the variance determining unit 94 is supplied with the first limitation determination signal Sr1 and determines whether a limit position determination angle θi on the left side has been newly acquired (Step 302). When a limit position determination angle θi on the left side has not been newly acquired (Step 302: NO), the processes subsequent thereto are not performed. On the other hand, when a limit position determination angle θi on the left side has been newly acquired (Step 302: YES), the variance determining unit 94 increments a count value Cr of an acquisition counter indicating the acquisition number n of the limit position determination angles θi (Step 303).

Subsequently, the variance determining unit 94 determines whether the count value Cr of the acquisition counter is "2" (Step 304), and calculates the first determination variance value Vd1 using Expression (2) and calculates the first variance ratio Rd1 (Step 305) when the count value Cr is "2" (Step 304: YES). Subsequently, the variance determining unit 94 compares the first variance ratio Rd1 with a variance threshold value Rth2 when the acquisition number n of the limit position determination angles θi is "2" (Step 306). When the first variance ratio Rd1 is equal to or less than the variance threshold value Rth2 (Step 306: YES), the variance determining unit 94 outputs the end contact determination data D1 to the end-position-corresponding angle setting unit 96 (Step 307), discards the acquired limit position determination angles θi (Step 308), and clears the count value Cr of the acquisition counter (Step 309).

When the count value Cr is not "2" (Step 304: NO), the variance determining unit 94 determines whether the count value Cr of the acquisition counter is "3" (Step 310), and calculates the first determination variance value Vd1 using Expression (2) and calculates the first variance ratio Rd1 (Step 311) when the count value Cr is "3" (Step 310: YES). Subsequently, the variance determining unit 94 compares the first variance ratio Rd1 with a variance threshold value Rth3 when the acquisition number n of the limit position determination angles θi is "3" (Step 312). When the first variance ratio Rd1 is equal to or less than the variance threshold value Rth3 (Step 312: YES), the variance determining unit 94 performs the processes of Steps 307 to 309.

When the count value Cr is not "3" (Step 310: NO), the variance determining unit 94 determines whether the count value Cr of the acquisition counter is "4" (Step 313), and calculates the first determination variance value Vd1 using Expression (2) and calculates the first variance ratio Rd1 (Step 314) when the count value Cr is "4" (Step 313: YES). Subsequently, the variance determining unit 94 compares the first variance ratio Rd1 with a variance threshold value Rth4 when the acquisition number n of the limit position determination angles θi is "4" (Step 315). When the first variance ratio Rd1 is equal to or less than the variance threshold value Rth4 (Step 315: YES), the variance determining unit 94 performs the processes of Steps 307 to 309.

When the count value Cr is not "4" (Step 313: NO), the variance determining unit 94 determines whether the count value Cr of the acquisition counter is equal to or greater "5" (Step 316). When the count value Cr is equal to or greater than "5" (Step 316: YES), the variance determining unit 94 calculates the first determination variance value Vd1 using Expression (2) and calculates the first variance ratio Rd1 (Step 317). Subsequently, the variance determining unit 94 compares the first variance ratio Rd1 with a variance threshold value Rth5 when the acquisition number n of the limit position determination angles θi is "5" (Step 318). When the first variance ratio Rd1 is equal to or less than the variance threshold value Rth5 (Step 318: YES), the variance determining unit 94 performs the processes of Steps 307 to 309. When the count value Cr is less than "5," that is, when the count value Cr is "1" (Step 316: NO), the variance determining unit 94 does not perform the subsequent processes.

On the other hand, when the first variance ratio Rd1 is greater than the variance threshold value Rth2 (Step 306: NO), when the first variance ratio Rd1 is greater than the variance threshold value Rth3 (Step 312: NO), when the first variance ratio Rd1 is greater than the variance threshold value Rth4 (Step 315: NO), and when the first variance ratio Rd1 is greater than the variance threshold value Rth5 (Step 318: NO), the variance determining unit 94 performs Step 319. In Step 319, the variance determining unit 94 increments a count value Ca of a rejection counter indicating the number of continuous determinations that the plurality of limit position determination angles θi is not data acquired when movement of the rack shaft 12 has been limited by an end contact (Step 319). Subsequently, the variance determining unit 94 determines whether the count value Ca of the rejection counter is greater than a predetermined count value Cth indicating an upper limit (Step 320). When the count value Ca is greater than the predetermined count value Cth (Step 320: YES), the variance determining unit 94 clears the count value Ca of the rejection counter (Step 321) and performs the processes of Steps 308 and 309. When the count value Ca is equal to or less than the predetermined count value Cth (Step 320: NO), the variance determining unit 94 does not perform the processes of Steps 321, 308, and 309.

Update Permitting Unit 95

As illustrated in FIG. 4, the steering torque Th, the absolute steering angle θs, the q-axis current value Iq, the angular velocity change Δωm, and the second limitation determination signal Sr2 are input to the update permitting unit 95. The update permitting unit 95 acquires a plurality of limit position determination angles θi based on the absolute steering angle θs when the second limitation determining unit 93 determines that movement of the rack shaft 12 has been limited. Similarly to the variance determining unit 94, the update permitting unit 95 in this embodiment performs rigidity compensation on the absolute steering angle θs when it is determined that movement of the rack shaft 12 has been limited and acquires the angle subjected to the rigidity compensation as the limit position determination angle θi. That is, the update permitting unit 95 is an example of an axial force detecting unit. The update permitting unit 95 determines whether the limit position determination angles are data acquired when movement of the rack shaft 12 has been limited by an end contact based on the variance of the plurality of limit position determination angles θi on the right or left side. When the plurality of limit position determination angles θi is data acquired when movement of the rack shaft 12 has been limited by an end contact, the update permitting unit 95 outputs the end contact determination data D2 including the plurality of limit position determination angles θi and an update permission signal Sp to the end-position-corresponding angle setting unit 96. The update permission signal Sp is a signal for permitting the end-position-corresponding angle setting unit 96 to update the end-position-corresponding angles θs_re and θs_le stored in the memory 64.

In the following description, for the purpose of convention of description, it is assumed that movement of the rack shaft 12 to the left side has been limited a plurality of times and a plurality of limit position determination angles θi on the left side is acquired, but the same process is also performed by the update permitting unit 95 when a plurality of limit position determination angles θi on the right side is acquired.

The update permitting unit 95 acquires an angle obtained by performing rigidity compensation on the absolute steering angle θs in the calculation cycle in which the second limitation determination signal Sr2 indicating that movement of the rack shaft 12 has been limited is input as the limit position determination angles θi, and acquires a pinion shaft torque Tp which is a determination axial force which is input in the same calculation cycle in correlation with the limit position determination angle θi. The update permitting unit 95 determines to which of the right side and the left side movement of the rack shaft 12 has been limited based on the sign of the absolute steering angle θs.

The limit position determination angles θi acquired by the update permitting unit 95 are classified into a plurality of axial force ranges which is set based on the magnitude of the pinion shaft torque Tp. Specifically, in the update permitting unit 95 in this embodiment, three ranges including a first axial force range in which the pinion shaft torque Tp is the minimum, a second axial force range in which the pinion shaft torque Tp is middle, and a third axial force range in which the pinion shaft torque Tp is the maximum are set as the axial force ranges. The update permitting unit 95 classifies the acquired limit position determination angles θi on the left side into the first to third axial force ranges based on the pinion shaft torques Tp correlated with the limit position determination angles θi.

When the acquisition number n of the limit position determination angles θi on the left side is equal to or greater than a predetermined calculation number nca and one or more limit position determination angles θi classified into the first to third axial force ranges are acquired, the update permitting unit 95 calculates a second determination variance value Vd2 which is a determination variance value used for determination using Expression (3). In this embodiment, the predetermined calculation number nca is "5."

$$Vd2 = \frac{1}{n-1}\sum_{i=1}^{n}(\theta i - \theta ave)^2 \qquad (3)$$

Subsequently, the update permitting unit 95 calculates a second variance ratio Rd2 (Rd2=Vd2/Vm) which is a variance ratio between the second determination variance value Vd2 and the predetermined variance value Vm.

The limit position determination angles θi which are acquired when it is determined that movement of the rack shaft 12 has been limited by execution of end contact relaxation control may vary, for example, depending on the magnitude of a road surface μ. On the other hand, when the limit position determination angles θi which are acquired when it is determined that movement of the rack shaft 12 has been limited by an end contact are mechanically determined depending on the structure of the EPS 2 and thus are less likely to vary. Accordingly, when the variance of the plurality of limit position determination angles θi is relatively small, it is thought that movement of the rack shaft 12 has not been limited by execution of end contact relaxation control based on the stored end-position-corresponding angles θs_re and θs_le and movement of the rack shaft 12 has been limited by an end contact. That is, it is thought that the stored end-position-corresponding angles θs_re and θs_le are displaced to a neutral steering position side with respect to an actual rack end angle which is an actual end angle at which an end contact actually occurs.

Taking this point into consideration, the update permitting unit 95 compares the second variance ratio Rd2 with a variance threshold value Rth5. The variance threshold value Rth5 is a value when the acquisition number n is "5" and is set in advance. When the second variance ratio Rd2 is equal to or less than the variance threshold value Rth5, the update permitting unit 95 determines that the plurality of limit position determination angle θi is data acquired when movement of the rack shaft 12 has been limited by an end contact.

Subsequently, the update permitting unit 95 calculates a temporary end position determination angle θe_t based on the plurality of limit position determination angles θi which are determined to be data acquired when movement of the rack shaft 12 has been limited by an end contact. The update permitting unit 95 in this embodiment calculates an average value of the plurality of limit position determination angle θi as the temporary end position determination angle θe_t.

The update permitting unit 95 calculates a difference between the temporary end position determination angle θe_t and the end-position-corresponding angle θs_le on the left side as a temporary end separation angle Δθ_t. On the assumption that the end separation angle Δθ is the temporary end separation angle Δθ_t, when the q-axis current command value Iq* limited by execution of end contact relaxation control is equal to or less than a current threshold value Ith, the update permitting unit 95 determines that end contact relaxation control is normally performed, and does not permit update of the end-position-corresponding angles θs_re and θs_le. In this embodiment, the current threshold value Ith is a threshold value corresponding to a torque threshold value based on a rated torque and is set to 50% of the rated current Ir.

Specifically, the update permitting unit 95 includes a map which is fixed when the vehicle speed SPD is zero with the same tendency as the map of the angle limiting component calculating unit 82. The update permitting unit 95 calculates a temporary angle limiting component Iga_t corresponding to the temporary end separation angle Δθ_t with reference to the map. When the temporary angle limiting component Iga_t is equal to or greater than 50% of the rated current Ir, the update permitting unit 95 determines that the q-axis current command value Iq* is equal to or less than the current threshold value Ith, and does not output the end contact determination data D2 and the update permission signal Sp to the end-position-corresponding angle setting unit 96. When the second variance ratio Rd2 is greater than the variance threshold value Rth5, the update permitting unit 95 determines that the plurality of limit position determination angles θi is not data acquired when movement of the rack shaft 12 has been limited by an end contact, and does not output the end contact determination data D2 and the update permission signal Sp to the end-position-corresponding angle setting unit 96. Thereafter, the update permitting unit 95 discards the plurality of limit position determination angles θi which has been acquired and repeats the above processes.

As described above, the steering angle limit value Ien which is an upper limit of the q-axis current command value Iq* is calculated by subtracting the angle limiting component Iga and the velocity limiting component Igs from the rated current Ir. Accordingly, when the angle limiting component Iga is equal to or greater than 50% of the rated current Ir, the steering angle limit value Ien is equal to or less than 50% of the rated current Ir regardless of the magnitude of the velocity limiting component Igs. Accordingly, when the temporary angle limiting component Iga_t is equal to or greater than 50% of the rated current Ir, the update permitting unit 95 determines that the q-axis current command value Iq* is equal to or less than the current threshold value Ith.

On the other hand, when the temporary angle limiting component Iga_t is less than 50% of the rated current Ir, the update permitting unit 95 outputs the end contact determination data D2 and the update permission signal Sp to the end-position-corresponding angle setting unit 96. Thereafter, the update permitting unit 95 discards the plurality of limit position determination angles θi which has been acquired and repeats the above processes.

Figure 9:
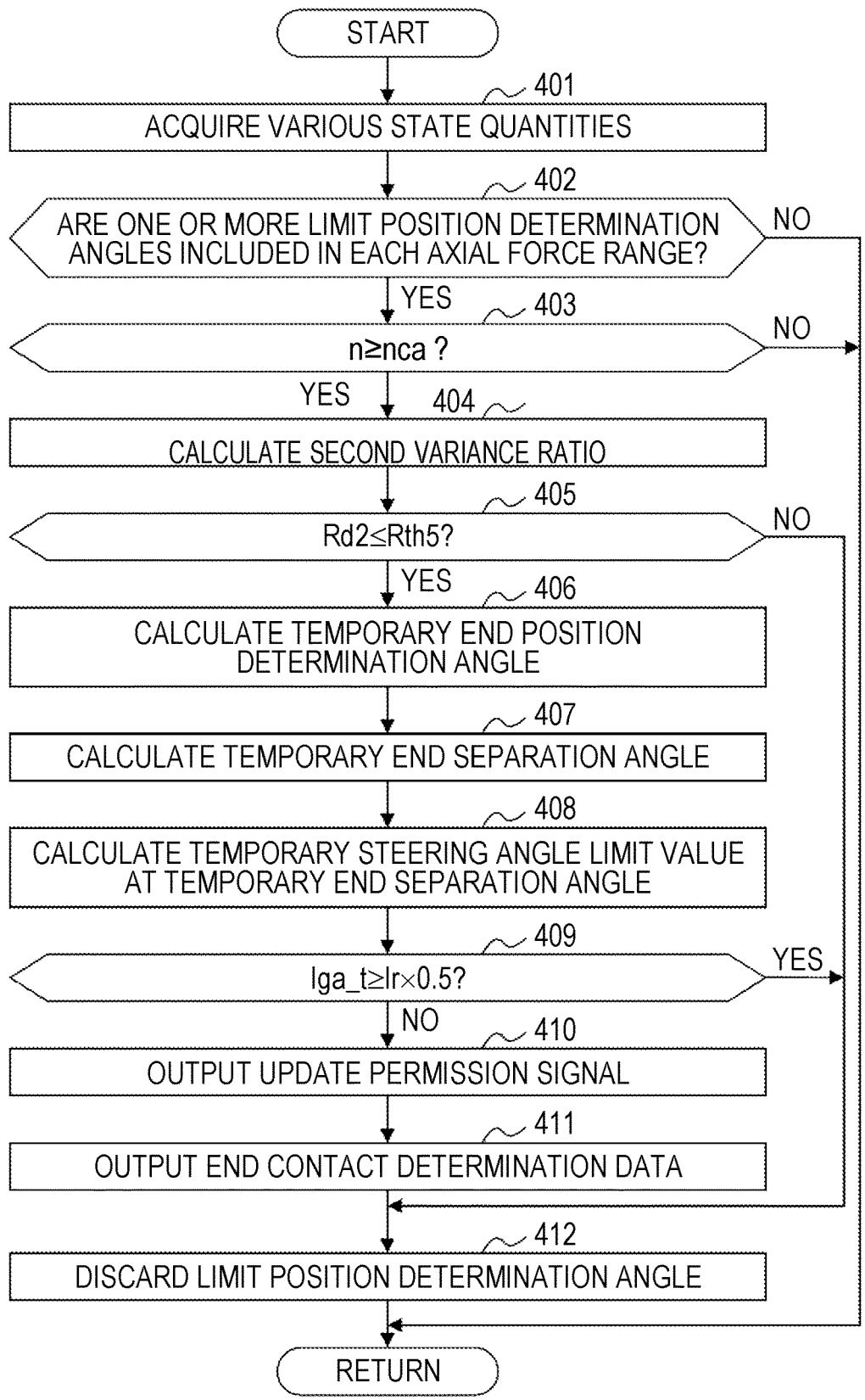
FIG. 9 is a flowchart illustrating an end contact determining process routine which is performed by an update permitting unit according to the first embodiment.

Specifically, as illustrated in the flowchart of FIG. 9, when various state quantities are acquired (Step 401), the update permitting unit 95 determines whether one or more limit position determination angles θi are classified based on the pinion shaft torque Tp in each of the first to third axial force ranges (Step 402). Subsequently, when it is determined that one or more limit position determination angles θi are classified based on the pinion shaft torque Tp in each of the first to third axial force ranges (Step 402: YES), the update permitting unit 95 determines whether the acquisition number n of the limit position determination angles θi is equal to or greater than a predetermined calculation number nca (Step 403). When it is determined that one or more limit position determination angles θi are not classified based on the pinion shaft torque Tp in each of the first to third axial force ranges (Step 402: NO) and when the acquisition number n of the limit position determination angles θi is less than the predetermined calculation number nca (Step 403: NO), the processes subsequent thereto are not performed.

When the acquisition number n of the limit position determination angles θi is equal to or greater than the predetermined calculation number nca (Step 403: YES), the update permitting unit 95 calculates the second determination variance value Vd2 using Expression (3) and calculates the second variance ratio Rd2 (Step 404). Subsequently, the update permitting unit 95 compares the second variance ratio Rd2 w2ith the variance threshold value Rth5 (Step 405), and calculates the temporary end position determination angle θe_t (Step 406) and calculates the temporary end separation angle Δθ_t (Step 407) when the second variance ratio Rd2 is equal to or less than the variance threshold value Rth5 (Step 405: YES). Then, the update permitting unit 95 calculates the temporary angle limiting component Iga_t at the temporary end separation angle Δθ_t (Step 408) and determines whether the temporary angle limiting component Iga_t is equal to or greater than 50% of the rated current Ir (Step 409).

When the temporary angle limiting component Iga_t is less than 50% of the rated current Ir (Step 409: NO), the update permitting unit 95 outputs the update permission signal Sp and the end contact determination data D2 to the end-position-corresponding angle setting unit 96 (Steps 410 and 411). Subsequently, the update permitting unit 95 discards the plurality of limit position determination angles θi which has been acquired (Step 412).

On the other hand, when the second variance ratio Rd2 is greater than the variance threshold value Rth5 (Step 405: NO) and when the temporary angle limiting component Iga_t is equal to or greater than 50% of the rated current Ir (Step 409: YES), the update permitting unit 95 does not perform the processes of Steps 406 to 411 and discards the plurality of limit position determination angles θi which has been acquired in Step 412.

End-Position-Corresponding Angle Setting Unit 96

As illustrated in FIG. 4, the steering torque Th, the absolute steering angle θs, the q-axis current value Iq, the angular velocity change Δωm, the first limitation determination signal Sr1, the end contact determination data D1 and D2, and the update permission signal Sp are input to the end-position-corresponding angle setting unit 96. The end-position-corresponding angle setting unit 96 sets the end-position-corresponding angles θs_re and θs_le in the memory 64 based on the input state quantities.

When the end-position-corresponding angles θs_re and θs_le are not set in the memory 64 or when the update permission signal Sp is input, the end-position-corresponding angle setting unit 96 sets the end-position-corresponding angles θs_re and θs_le. The end-position-corresponding angle setting unit 96 acquires a plurality of limit position determination angles θi corresponding to the absolute steering angle θs in the calculation cycle in which the first limitation determination signal Sr1 indicating that movement of the rack shaft 12 has been limited is input. Similarly to the variance determining unit 94, the end-position-corresponding angle setting unit 96 in this embodiment performs rigidity compensation on the absolute steering angle θs when movement of the rack shaft 12 has been limited and acquires the angle subjected to the rigidity compensation as a limit position determination angle θi. That is, the end-position-corresponding angle setting unit 96 is an example of an axial force detecting unit. The end-position-corresponding angle setting unit 96 determines to which of the right side and the left side movement of the rack shaft 12 has been limited based on the sign of the absolute steering angle θs. When the limit position determination angles θi on the right and left sides are acquired, the end-position-corresponding angle setting unit 96 sets the end-position-corresponding angles θs_re and θs_le based on the acquired limit position determination angles.

Specifically, the end-position-corresponding angle setting unit 96 first calculates a stroke width Wma which is a sum of the absolute value of the limit position determination angle θi on the right side and the absolute value of the limit position determination angle θi on the left side. When the stroke width Wma is greater than a first stroke threshold value Wth1 and less than a second stroke threshold value Wth2, the end-position-corresponding angle setting unit 96 sets the acquired limit position determination angles θi on the right and left sides as the end-position-corresponding angles θs_re and θs_le. The first stroke threshold value Wth1 is an angle range which is expressed by the absolute steering angle θs and is set to a range which is slightly less than an angle range corresponding to an entire stroke range of the rack shaft 12. The second stroke threshold value Wth2 is an angle range which is expressed by the absolute steering angle θs and is set to a range which is slightly greater than the angle range corresponding to the entire stroke range of the rack shaft 12.

For example, depending on a traveling situation of a vehicle, an end contact on only one of the right and left sides may occur repeatedly in a state in which the end-position-corresponding angles θs_re and θs_le are not set, and thus the limit position determination angle θi on one side may not be acquired. In this case, the end-position-corresponding angle setting unit 96 first sets only the end-position-corresponding angle θs_le on the left side or the end-position-corresponding angle θs_re on the right side based on the end contact determination data D1 output from the variance determining unit 94. The end-position-corresponding angle setting unit 96 in this embodiment sets an average value of the end contact determination data D1 as the end-position-corresponding angle θs_re on the right side or the end-position-corresponding angle θs_le on the left side. Subsequently, the end-position-corresponding angle setting unit 96 acquires the limit position determination angles θi on the right and left sides as described above and sets the end-position-corresponding angles θs_re and θs_le.

For example, it is assumed that the actual rack end angle at which an end contact s actually occur and the stored end-position-corresponding angles θs_re and θs_le are displaced from each other by exchanging the steering shaft 11 at the time of repairing of the vehicle. In this case, the end-position-corresponding angle setting unit 96 first sets only the end-position-corresponding angle θs_re on the right side or the end-position-corresponding angle θs_le on the left side based on the end contact determination data D2 output from the update permitting unit 95. The end-position-corresponding angle setting unit 96 in this embodiment sets the average value of the end contact determination data D2 as the end-position-corresponding angle θs_re or θs_le. Subsequently, the end-position-corresponding angle setting unit 96 acquires the limit position determination angles θi on the right and left sides as described above and sets the end-position-corresponding angles θs_re and θs_le.

Figure 10:
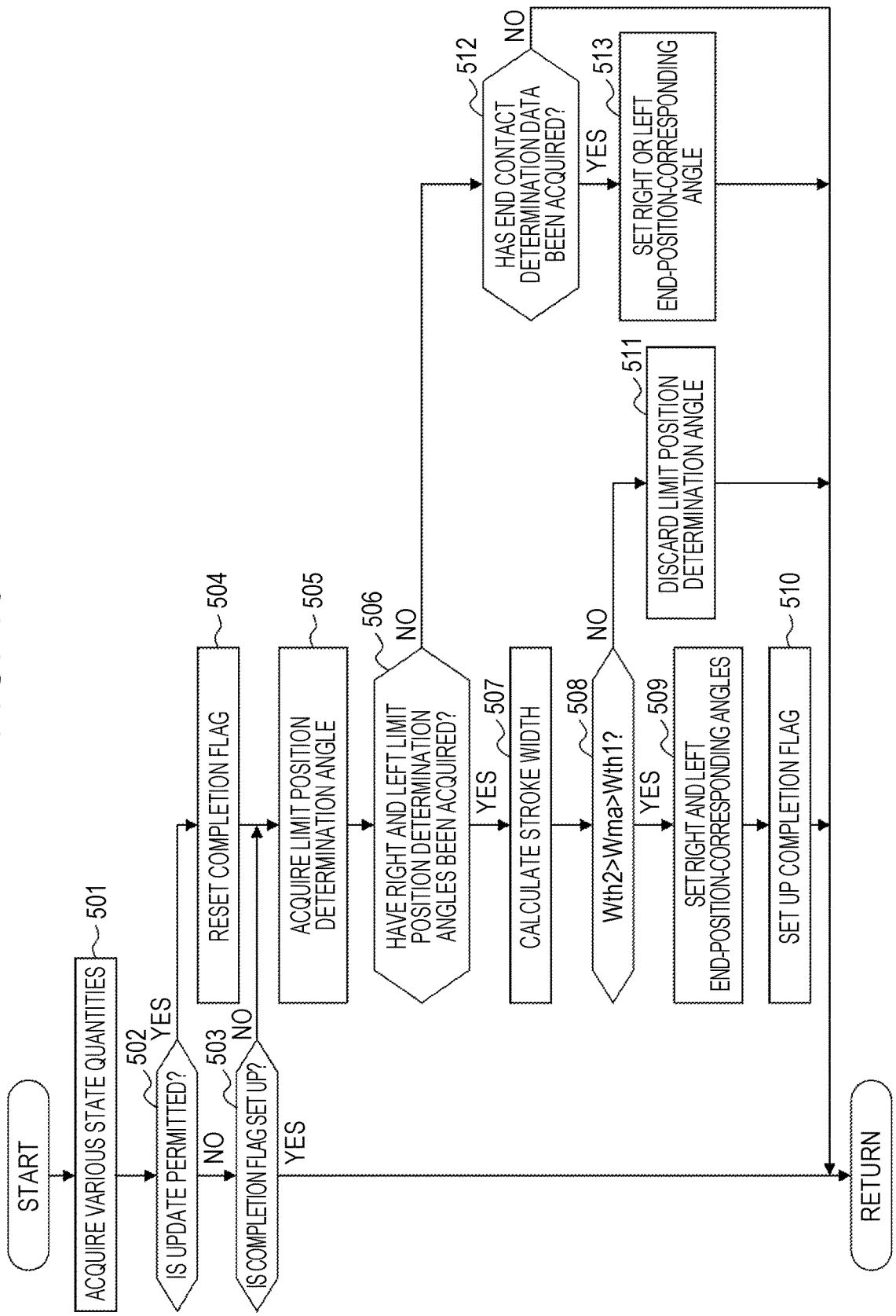
FIG. 10 is a flowchart illustrating a process routine of setting end-position-corresponding angles on the right and left sides which is performed by the end-position-corresponding angle setting unit according to the first embodiment.

Specifically, as illustrated in the flowchart of FIG. 10, when various state quantities are acquired (Step 501), the end-position-corresponding angle setting unit 96 determines whether an update permission signal Sp indicating that update is permitted is input (Step 502). When the update permission signal Sp is not input (Step 502: NO), the end-position-corresponding angle setting unit 96 determines whether a completion flag indicating that the end-position-corresponding angles θs_re and θs_le are set in the memory 64 is set (Step 503). When the completion flag is set (Step 503: YES), the processes subsequent thereto are not performed.

When the update permission signal Sp is input (Step 502: YES), the end-position-corresponding angle setting unit 96 resets the completion flag (Step 504) and acquires the limit position determination angles θi in the calculation cycle in which the first limitation determination signal Sr1 is input (Step 505). Even when the completion flag is not set (Step 503: NO), the end-position-corresponding angle setting unit 96 acquires the limit position determination angles θi in Step 505.

Subsequently, the end-position-corresponding angle setting unit 96 determines whether the limit position determination angles θi on the right and left sides are acquired (Step 506), and calculates the stroke width Wma (Step 507) when the limit position determination angle θi on the right and left sides are acquired (Step 506: YES). Subsequently, the end-position-corresponding angle setting unit 96 determines whether the stroke width Wma is greater than the first stroke threshold value Wth1 and less than the second stroke threshold value Wth2 (Step 508). When the stroke width Wma is greater than the first stroke threshold value Wth1 and less than the second stroke threshold value Wth2 (Step 508: YES), the end-position-corresponding angle setting unit 96 sets the limit position determination angles θi on the right and left sides which are used to calculate the stroke width Wma as the end-position-corresponding angles θs_re and θs_le (Step 509), and sets the completion flag (Step 510). When the stroke width Wma is equal to or less than the first stroke threshold value Wth1 or when the stroke width Wma is equal to or greater than the second stroke threshold value Wth2 (Step 508: NO), the end-position-corresponding angle setting unit 96 discards the acquired limit position determination angles θi (Step 511).

On the other hand, when only the limit position determination angle θi on the right or left side is acquired (Step 506:

NO), the end-position-corresponding angle setting unit 96 determines whether one of the end contact determination data D1 and D2 is input (Step 512). When one of the end contact determination data D1 and D2 is input (Step 512: YES), the end-position-corresponding angle setting unit 96 sets only the end-position-corresponding angle θs_re on the right side or the end-position-corresponding angle θs_le on the left side based on the input end contact determination data D1 or D2 (Step 513). When none of the end contact determination data D1 and D2 is not input (Step 512: NO), the processes subsequent thereto are not performed.

Operations and advantageous effects of this embodiment will be described below. As described above, it is thought that movement of the rack shaft 12 has been limited to a virtual end position by execution of end contact relaxation control when the variance of the plurality of limit position determination angles θi is great, and movement of the rack shaft 12 has not been limited by execution of end contact relaxation control but movement of the rack shaft 12 has been limited by an end contact when the variance of the plurality of limit position determination angles θi is relatively small. Accordingly, the end-position-corresponding angle managing unit 65 permits update of the end-position-corresponding angles θs_re and θs_le based on the variance of the plurality of limit position determination angles θi, and updates the end-position-corresponding angles θs_re and θs_le stored in the memory 64. As a result, for example, even when an actual rack end angle and the stored end-position-corresponding angles θs_re and θs_le are displaced from each other by exchanging the steering shaft 11 at the time of repairing of the vehicle, it is possible to decrease displacement of the stored end-position-corresponding angles θs_re and θs_le to the neutral steering position with respect to the actual rack end angle according to this embodiment.

The update permitting unit 95 calculates the second determination variance value Vd2 of the plurality of limit position determination angles θi using Expression (3). When the second variance ratio Rd2 which is a ratio of the predetermined variance value Vm to the second determination variance value Vd2 is equal to or less than the variance threshold value Rth5, it is determined that the plurality of limit position determination angles θi is data acquired when movement of the rack shaft 12 has been limited by an end contact. Accordingly, it is possible to suitably determine whether the plurality of limit position determination angle θi is data acquired when movement of the rack shaft 12 has been limited by an end contact.

The first limitation determining unit 92 and the second limitation determining unit 93 determine to which of the right and left sides movement of the rack shaft 12 has been limited based on the motor angular velocity corn, the angular velocity change Δωm, and the steering torque Th. Accordingly, for example, without providing a dedicated sensor for detecting movement of the rack shaft 12, it is possible to easily determine whether movement of the rack shaft 12 has been limited.

The update permitting unit 95 correlates the limit position determination angle θi with the pinion shaft torque Tp when the second limitation determining unit 93 determines that movement of the rack shaft 12 has been limited, and classifies the limit position determination angles θi into the first to third axial force ranges which are set based on the magnitude of the pinion shaft torque Tp. The plurality of limit position determination angles θi which is used to calculate the second determination variance value Vd2 includes one or more limit position determination angles θi which is classified into each of the first to third axial force ranges. In this way, the update permitting unit 95 uses the plurality of limit position determination angles θi which are classified into different axial force ranges, that is, the limit position determination angle θi acquired when the pinion shaft torque Tp is great and the limit position determination angle θi acquired when the pinion shaft torque Tp is relatively small, as data which is used to determine the variance.

In general, the pinion shaft torque Tp when an end contact occurs is likely to be great at the time of forward travel of a vehicle and the pinion shaft torque Tp when an end contact occurs is likely to be small at the time of reverse travel of the vehicle. Accordingly, in this embodiment, data which is used to determine the variance includes the limit position determination angles θi when it is determined that movement of the rack shaft 12 has been limited at the time of forward travel and reverse travel of the vehicle. As a result, it is possible to more suitably determine whether movement of the rack shaft 12 has been limited by an end contact.

The update permitting unit 95 calculates the temporary end position determination angle θe_t based on the plurality of limit position determination angle θi which is determined to be data acquired when movement of the rack shaft 12 has been limited by an end contact, and calculates the temporary end separation angle Δθ_t indicating a distance of the temporary end position determination angle θe_t from the end-position-corresponding angles θs_re and θs_le. The update permitting unit 95 calculates the temporary angle limiting component Iga_t corresponding to the temporary end separation angle Δθ_t, and considers that the q-axis current command value Iq* is limited to be equal to or less than the current threshold value Ith and does not permit update of the end-position-corresponding angles θs_re and θs_le when the temporary angle limiting component Iga_t is equal to or greater than 50% of the rated current Ir.

Here, when the stored end-position-corresponding angles θs_re and θs_le are not displaced to the neutral steering position with respect to the actual rack end angle and turning is performed at a high speed, for example, on a low μ road, the rack shaft 12 may come into contact with the rack housing 13. In this case, when the q-axis current command value Iq* is limited to be equal to or less than the current threshold value Ith, end contact relaxation control based on the stored end-position-corresponding angles θs_re and θs_le can also works normally and displacement of the end-position-corresponding angles θs_re and θs_le to the neutral steering position side with respect to the actual rack end angle is considered not to cause any problem. Accordingly, when the q-axis current command value Iq* calculated based on the temporary end separation angle Δθ_t is equal to or less than the current threshold value Ith as in this embodiment, it is possible to prevent the end-position-corresponding angles θs_re and θs_le from being unnecessarily updated by not permitting update of the end-position-corresponding angles θs_re and θs_le.

When the limit position determination angles θi on the right and left sides are acquired, the end-position-corresponding angle managing unit 65 compares the stroke width Wma with the first stroke threshold value Wth1 and the second stroke threshold value Wth2. When the stroke width Wma is greater than the first stroke threshold value Wth1 and less than the second stroke threshold value Wth2, the end-position-corresponding angle managing unit 65 sets the end-position-corresponding angles θs_re and θs_le on the right and left sides based on the limit position determination angles θi on the right and left sides. Accordingly, without waiting until a plurality of limit position determination angles θi on the right or left side is acquired, it is possible to rapidly set the end-position-corresponding angles θs_re and θs_le on the right and left sides which accurately correspond to the actual rack end angle.

On the other hand, when a plurality of limit position determination angles θi on only one of the right and left sides is acquired, the end-position-corresponding angle managing unit 65 determines whether the plurality of limit position determination angles θi is data acquired when movement of the rack shaft 12 has been limited by an end contact based on the variance of the plurality of limit position determination angles θi. The end-position-corresponding angle managing unit 65 sets the end-position-corresponding angle θs_re on the right side or the end-position-corresponding angle θs_le on the left side based on the end contact determination data D1 including the plurality of limit position determination angles θi on the right or left side which is determined to be data acquired when movement of the rack shaft 12 has been limited by an end contact.

As described above, movement of the rack shaft 12 is considered to be limited by contact with a curbstone or the like when the variance of the plurality of limit position determination angles θi is relatively great, and movement of the rack shaft 12 is considered to be limited by an end contact when the variance of the plurality of limit position determination angles θi is relatively small. Accordingly, by using the variance of a plurality of limit position determination angles θi as in this embodiment, it is possible to set the end-position-corresponding angles θs_re and θs_le which accurately correspond to an actual end angle.

The variance determining unit 94 calculates the first determination variance value Vd1 of the plurality of limit position determination angles θi using Expression (2). When the first variance ratio Rd1 which is a ratio of the predetermined variance value Vm to the first determination variance value Vd1 is equal to or less than the variance threshold value Rthn which is set based on the acquisition number n, the variance determining unit 94 determines that the plurality of limit position determination angle θi is data acquired when movement of the rack shaft 12 has been limited by an end contact. Accordingly, it is possible to suitably determine whether the plurality of limit position determination angles θi is data acquired when movement of the rack shaft 12 has been limited by an end contact. Particularly, since the variance determining unit 94 in this embodiment calculates the first determination variance value Vd1 when two or more limit position determination angles θi are acquired, for example, it is possible to calculate the first determination variance value Vd1 earlier in comparison with a case in which the first determination variance value Vd1 is calculated after the limit position determination angles θi corresponding to the predetermined calculation number nca have been acquired.

Since the end-position-corresponding angle setting unit 96 sets the average value of the end contact determination data D1 and D2 as the end-position-corresponding angle θs_re on the right side or the end-position-corresponding angle θs_le on the left side, it is possible to suitably set the end-position-corresponding angles θs_re and θs_le which accurately correspond to an actual end angle.

Second Embodiment

A steering control device according to a second embodiment will be described below with reference to the accompanying drawings. This is mainly different from the first embodiment in only calculate of the second determination variance value Vd2 in the update permitting unit 95. Accordingly, for the purpose of convenience of description, the same elements will be referred to by the same reference signs as in the first embodiment and description thereof will be omitted.

When a plurality of limit position determination angles θi on the left side is acquired, the update permitting unit 95 in this embodiment arranges and holds the limit position determination angles θi in increasing order of the pinion shaft torque Tp. When the limit position determination angles θi corresponding to a predetermined acquisition number nth are acquired, the update permitting unit 95 selects the limit position determination angles θi corresponding to a predetermined calculation number nca in increasing order of the pinion shaft torque Tp, that is, the axial force acting on the rack shaft 12, and calculates the second determination variance value Vd2 of the selected limit position determination angles θi using Expression (2). Thereafter, similarly to the first embodiment, the update permitting unit 95 calculates the second variance ratio Rd2 and outputs the update permission signal Sp and the end contact determination data D2 to the end-position-corresponding angle setting unit 96. In this embodiment, the predetermined acquisition number nth is "10" and the predetermined calculation number nca is "5."

Figure 11:
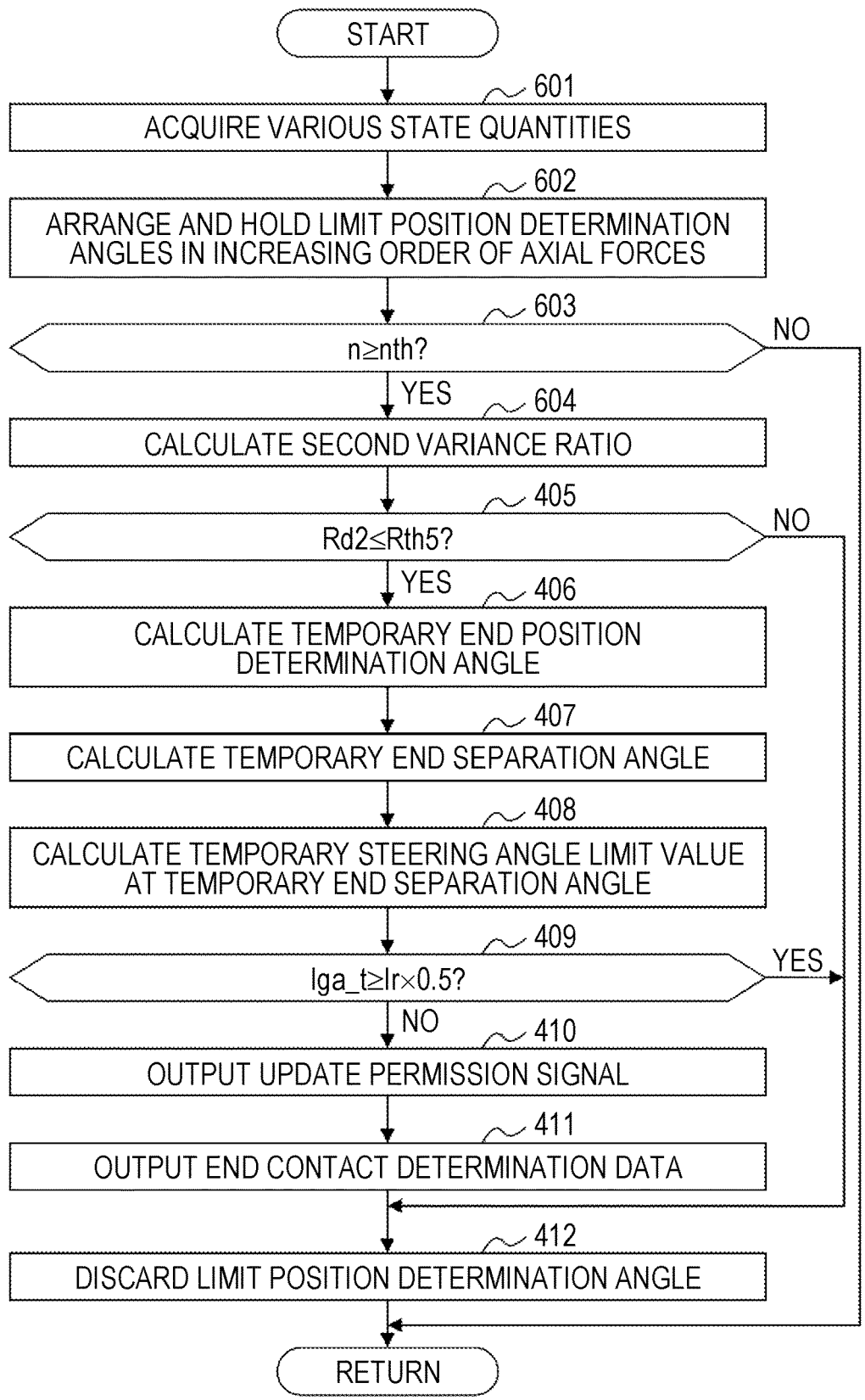
FIG. 11 is a flowchart illustrating an end contact determining process routine which is performed by an update permitting unit according to a second embodiment.

Specifically, as illustrated in the flowchart of FIG. 11, when various state quantities are acquired (Step 601), the update permitting unit 95 arranges and holds the limit position determination angles θi in increasing order of the pinion shaft torque Tp correlated with the limit position determination angles θi (Step 602). Subsequently, the update permitting unit 95 determines whether the acquisition number n of the limit position determination angles θi is equal to or greater than the predetermined acquisition number nth (Step 603). When the acquisition number n of the limit position determination angles θi is less than the predetermined acquisition number nth (Step 603: NO), the processes subsequent thereto are not performed.

On the other hand, when the acquisition number n of the limit position determination angles θi is equal to or greater than the predetermined acquisition number nth (Step 603: YES), the update permitting unit 95 selects the limit position determination angles θi corresponding to the predetermined calculation number nca in increasing order of the pinion shaft torque Tp, calculates the second determination variance value Vd2 of the selected limit position determination angles θi using Expression (2), and calculates the second variance ratio Rd2 (Step 604). Thereafter, similarly to the first embodiment, Step 405 of comparing the second variance ratio Rd2 with the variance threshold value Rth5 is performed and the processes of Steps 406 to 412 are performed based on the result of comparison.

In this embodiment, the following operations and advantageous effects are achieved in addition to the operations and advantageous effects of the first embodiment. The update permitting unit 95 correlates the limit position determination angle θi with the pinion shaft torque Tp when the second limitation determining unit 93 determines that movement of the rack shaft 12 has been limited. The plurality of limit position determination angles θi which is used to calculate the second determination variance value Vd2 includes the limit position determination angles θi corresponding to the predetermined calculation number nca which are selected in the increasing order of the pinion shaft torque Tp.

When the end separation angle Δθ is equal to or less than a predetermined angle θ1, the q-axis current command value Iq* is limited such that decrease of the end separation angle Δθ is limited by execution of end contact relaxation control, and thus the limit position determination angle θi correlated with the pinion shaft torque Tp is likely to increase as the pinion shaft torque Tp decreases. That is, as the pinion shaft torque Tp decreases, the likelihood that the limit position determination angle θi correlated with the pinion shaft torque Tp will be an angle close to the actual rack end angle increases. Accordingly, by calculating the second determination variance value Vd2 based on the limit position determination angles θi corresponding to the predetermined calculation number nca which are selected in the increasing order of the pinion shaft torque Tp as in this embodiment, it is possible to more suitably determine whether movement of the rack shaft 12 has been limited by an end contact.

The above embodiments can be modified as follows. The above embodiments and the following modified examples can be combined unless technical confliction arises. In the embodiments, when the limit position determination angles θi on the right and left sides are acquired, the stroke width Wma is compared with the first stroke threshold value Wth1 and the second stroke threshold value Wth2. However, the disclosure is not limited thereto, but the stroke width Wma may be compared with only the first stroke threshold value Wth1 and the end-position-corresponding angles θs_re and θs_le on the right and left sides may be set based on the limit position determination angles θi on the right and left sides when the stroke width Wma is greater than the first stroke threshold value Wth1.

In the embodiments, the average value of the end contact determination data D1 and D2 is set as the end-position-corresponding angle θs_re on the right side or the end-position-corresponding angle θs_le on the left side. However, the disclosure is not limited thereto, but, for example, the limit position determination angle θi with the largest absolute value out of the end contact determination data D1 and D2 may be set as the end-position-corresponding angle θs_re on the right side or the end-position-corresponding angle θs_le on the left side. With this configuration, it is also possible to set the end-position-corresponding angles θs_re and θs_le which accurately correspond to an actual end angle.

In the embodiments, the end-position-corresponding angle setting unit 96 sets the end-position-corresponding angle θs_re or θs_le on the right or left side based on the plurality of limit position determination angles θi which is determined to be data acquired when movement of the rack shaft 12 has been limited by an end contact. However, the disclosure is not limited thereto, but the end-position-corresponding angle θs_re or θs_le on the right or left side may be set based on the plurality of limit position determination angles θi before it is determined whether they are data acquired when movement of the rack shaft 12 has been limited by an end contact.

In the embodiments, even when the limit position determination angles θi on the right and left sides are acquired, the end-position-corresponding angle setting unit 96 may determine whether the plurality of limit position determination angles θi are data acquired when movement of the rack shaft 12 has been limited by an end contact based on the plurality of limit position determination angles θi and set the end-position-corresponding angles θs_re and θs_le on the right and left sides.

In the embodiments, a method of calculating the second determination variance value Vd2 in consideration of the pinion shaft torque Tp which is performed the update permitting unit 95 may be used as the method of calculating the first determination variance value Vd1 which is performed by the variance determining unit 94. Similarly, a method of calculating the first determination variance value Vd1 without consideration of the pinion shaft torque Tp which is performed by the variance determining unit 94 may be used as the method of calculating the second determination variance value Vd2 which is performed by the update permitting unit 95.

In the embodiments, the first limitation determining unit 92 may perform only one of static limitation determination and dynamic limitation determination. The second limitation determining unit 93 may perform both static limitation determination and dynamic limitation determination or perform only dynamic limitation determination. When determination which is performed by the first limitation determining unit 92 matches the determination Ith which is performed by the second limitation determining unit 93, the end-position-corresponding angle managing unit 65 has only to include only one limitation determining unit.

In the embodiments, the first limitation determining unit 92 determines to which of the right and left sides movement of the rack shaft 12 has been limited based on the motor angular velocity ωm, the angular velocity change Δωm, and the steering torque Th, but the disclosure is not limited thereto and the determination method can be appropriately modified. For example, a contact sensor may be provided between the rack end 18 and the rack housing 13 and to which of the right and left sides movement of the rack shaft 12 has been limited may be determined based on an output signal from the contact sensor. Similarly, the determination method in the second limitation determining unit 93 can also be appropriately modified.

In the embodiments, the update permitting unit 95 calculates the average value of the plurality of limit position determination angles θi as the temporary end position determination angle θe_t, but the disclosure is not limited thereto and, for example, the limit position determination angle θi with the maximum or minimum absolute angle out of the plurality of limit position determination angles θi may be calculated as the temporary end position determination angle θe_t.

In the first embodiment, the limit position determination angles θi are classified into the first to third axial force ranges based on the pinion shaft torque Tp, but the disclosure is not limited thereto and the limit position determination angles θi may be classified into two axial force ranges or four or more axial force ranges.

In the first embodiment, the plurality of limit position determination angles θi which is used to calculate the second determination variance value Vd2 include one or more limit position determination angles θi which are classified into each of the first to third axial force ranges, but the disclosure is not limited thereto and one or more limit position determination angles θi which are classified into two or more of the first to third axial force ranges may be included therein.

In the embodiments, the current threshold value Ith is set to 50% of the rated current Ir, but the disclosure is not limited thereto and the current threshold value Ith may be set to, for example, 40% or 60%. The value thereof can be appropriately changed. In the embodiments, when the temporary angle limiting component Iga_t is equal to or greater than 50% of the rated current Ir, the q-axis current command value Iq* is determined to be equal to or less than the current threshold value Ith, but the disclosure is not limited thereto and, for example, a temporary q-axis current command value based on the assumption that the end separation angle Δθ is the temporary end separation angle Δθ_t may be calculated and compared with the current threshold value Ith.

In the embodiments, when it is determined that the second variance ratio Rd2 is equal to or less than the variance threshold value Rth5 and the plurality of limit position determination angles θi is data acquired when movement of the rack shaft 12 has been limited by an end contact, the end-position-corresponding angles θs_re and θs_le may be updated regardless of whether the q-axis current command value Iq* is limited to be equal to or less than the current threshold value Ith.

In the embodiments, after the end-position-corresponding angles θs_re and θs_le have been set once, necessity of the update thereof may not be determined and the update may not be permitted. In the embodiments, the pinion shaft torque Tp is calculated based on the steering torque Th, the motor torque, and the inertial torque, but the disclosure is not limited thereto and the pinion shaft torque Tp may be calculated based on, for example, the steering torque Th and the motor torque for the purpose of reduction of a calculation load. The pinion shaft torque Tp which is used for rigidity compensation which is performed on the acquired absolute steering angle θs as the result of dynamic limitation determination and the pinion shaft torque Tp which is used for rigidity compensation which is performed on the acquired absolute steering angle θs as the result of static limitation determination may be different from each other.

In the embodiments, the absolute steering angle θs when the variance determining unit 94, the update permitting unit 95, and the end-position-corresponding angle setting unit 96 determine that movement of the rack shaft 12 has been limited may be acquired as the limit position determination angle θi without any change and rigidity compensation may not be performed thereon.

In the embodiments, the pinion shaft torque Tp is used as the determination axial force, but the disclosure is not limited thereto and another state quantity which approximates an axial force acting on the rack shaft 12 may be used. In the second embodiment, the acquired limit position determination angles θi on the left side are arranged and held in the increasing order of the pinion shaft torque Tp in Step 603, but the disclosure is not limited thereto and the acquired limit position determination angles θi on the left side may not be arranged in the increasing order of the pinion shaft torque Tp but may be simply held. In this case, in Step 604, the limit position determination angles θi corresponding to the predetermined calculation number nca are selected in the increasing order of the pinion shaft torque Tp out of the limit position determination angles θi corresponding to the predetermined acquisition number nth.

In the second embodiment, the predetermined acquisition number nth is set to be greater than the predetermined calculation number nca, but the disclosure is not limited thereto and the predetermined acquisition number nth can be appropriately changed as long as it is equal to or greater than the predetermined calculation number nca. The predetermined calculation number nca can be appropriately changed.

In the embodiments, by monitoring the rotation of the motor 21 even when the ignition switch is turned off, the rotation speed of the motor 21 from the origin is normally integrated, and the absolute motor angle and the absolute steering angle θs are detected. However, the disclosure is not limited thereto and, for example, a steering sensor that detects a steering angle as an absolute angle may be provided, the rotation speed of the motor 21 from the origin may be integrated based on the steering angle detected by the steering sensor and the reduction gear ratio of the reduction gear mechanism 22, and the absolute motor angle and the absolute steering angle θs may be detected.

In the embodiments, end contact relaxation control is performed by limiting the assist command value Ias* to the steering angle limit value Ien, but the disclosure is not limited thereto and end contact relaxation control may be performed, for example, by adding a steering reaction component increasing as it approaches the rack end position, that is, a component with a sign opposite to the sign of the assist command value Ias*, to the assist command value Ias*.

In the embodiments, a guard process is performed on the assist command value Ias*, but the disclosure is not limited thereto and, for example, the guard process may be performed on a value obtained by correcting the assist command value Ias* using a compensation value based on a torque differential value obtained by differentiating the steering torque Th.

In the embodiments, the limit value setting unit 62 includes the voltage limit value calculating unit 72 that calculates the voltage limit value Ivb based on the source voltage Vb, but the disclosure is not limited thereto and another calculation unit that calculates another limit value based on another state quantity may be provided in addition to or instead of the voltage limit value calculating unit 72. A configuration in which the limit value setting unit 62 does not include the voltage limit value calculating unit 72 and sets the steering angle limit value Ien as the limit value Ig without any change may be employed.

In the embodiments, a value obtained by subtracting only the angle limiting component Iga from the rated current Ir may be used. In the embodiments, the steering control device 1 controls the EPS 2 of a type in which the EPS actuator 6 applies a motor torque to the column shaft 15, but the disclosure is not limited thereto and, for example, the steering control device 1 may control a steering system of a type in which a motor torque is applied to the rack shaft 12 via a ball screw nut. Not limited to the EPS, the steering control device 1 may control a steer-by-wire type steering device in which transmission of power between a steering unit which is operated by a driver and a turning unit that turns the turning wheels is cut off and end contact relaxation control may be performed on a torque command value or a q-axis current command value of a motor of a turning actuator which is provided in the turning unit as in this embodiment.

What is claimed is:

1. A steering control device that controls a steering system including a housing, a turning shaft which is accommodated in the housing such that the turning shaft is able to reciprocate, and an actuator which applies a motor torque for causing the turning shaft to reciprocate using a motor as a drive source, the steering control device characterized by comprising an electronic control unit, wherein:

the electronic control unit is configured to detect an absolute steering angle which is a rotation angle of a rotation shaft which is able to be converted into a turning angle of turning wheels connected to the turning shaft and which is expressed as an absolute angle including a range exceeding 360°;

the electronic control unit is configured to control driving of the motor such that the motor torque reaches a torque command value, the electronic control unit being configured to store an end-position-corresponding angle, the end-position-corresponding angle being an angle which indicates an end position at which movement of the turning shaft is limited by an end contact in which the turning shaft comes into contact with the housing and which is correlated with the absolute steering angle, the electronic control unit being configured to perform end contact relaxation control when an end separation angle indicating a distance of the absolute steering angle from the end-position-corresponding angle is equal to or less than a predetermined angle, the end contact relaxation control being control for correcting the torque command value such that a decrease of the end separation angle is limited;

the electronic control unit is configured to determine whether the movement of the turning shaft to one of right and left sides has been limited by the end contact or execution of the end contact relaxation control;

the electronic control unit is configured to acquire a plurality of limit position determination angles corresponding to the absolute steering angle when the electronic control unit determines that the movement of the turning shaft has been limited, the electronic control unit being configured to permit update of the end-position-corresponding angle based on a variance of the plurality of limit position determination angles; and the electronic control unit is configured to update the end-position-corresponding angle stored in the electronic control unit when the electronic control unit permits update of the end-position-corresponding angle.

2. The steering control device according to claim 1, wherein the electronic control unit is configured to calculate a determination variance value which is a variance value of n limit position determination angles using a following expression, wherein the electronic control unit is configured to set a variance value of the plurality of limit position determination angles when the movement of the turning shaft has been limited by the end contact as a predetermined variance value, and wherein the electronic control unit is configured to determine the n limit position determination angles to be predetermined data acquired when a variance ratio which is a ratio between the determination variance value and the predetermined variance value is equal to or less than a variance threshold value which is set according to n, the predetermined data being data which is acquired when the movement of the turning shaft has been limited by the end contact, $$Vd = \frac{1}{n-1}\sum_{i=1}^{n}(\theta i - \theta ave)^2$$

where θave is an average value of the n limit position determination angles.

3. The steering control device according to claim 1, wherein the electronic control unit is configured to detect an axial force acting on the turning shaft, wherein the electronic control unit is configured to correlate a determination axial force when the electronic control unit determines that the movement of the turning shaft has been limited with the limit position determination angle, and wherein the electronic control unit is configured to classify the limit position determination angles into a plurality of axial force ranges which is set based on a magnitude of the axial force, the plurality of limit position determination angles which is used to calculate the variance including one or more limit position determination angles classified into two or more of the plurality of axial force ranges.

4. The steering control device according to claim 1, wherein the electronic control unit is configured to detect an axial force acting on the turning shaft, wherein the electronic control unit is configured to correlate a determination axial force when the electronic control unit determines that the movement of the turning shaft has been limited with the limit position determination angle, the plurality of limit position determination angles which is used to calculate the variance including a predetermined calculation number of the limit position determination angles which are selected in increasing order of the determination axial force.

5. The steering control device according to claim 1, wherein the electronic control unit is configured to calculate a temporary end separation angle, the temporary end separation angle indicating a distance of a temporary end position determination angle based on the plurality of limit position determination angles from the end-position-corresponding angle, and wherein the electronic control unit is configured to prohibit update of the end-position-corresponding angle when the end separation angle is the temporary end separation angle and the torque command value which is calculated by execution of the end contact relaxation control is equal to or less than a torque threshold value based on a rated torque.

6. A steering control device that controls a steering system including a housing, a turning shaft which is accommodated in the housing such that the turning shaft is able to reciprocate, and an actuator which applies a motor torque for causing the turning shaft to reciprocate using a motor as a drive source, the steering control device comprising an electronic control unit, wherein:

the electronic control unit is configured to detect an absolute steering angle which is a rotation angle of a rotation shaft which is able to be converted into a turning angle of turning wheels connected to the turning shaft and which is expressed as an absolute angle including a range exceeding 360°;

the electronic control unit is configured to determine whether movement of the turning shaft to one of right and left sides has been limited;

the electronic control unit is configured to acquire a plurality of limit position determination angles corresponding to the absolute steering angle when the electronic control unit determines that the movement of the turning shaft has been limited, the electronic control unit being configured to determine whether the plurality of limit position determination angles on the right or left side is predetermined data based on a variance of the plurality of limit position determination angles on the right or left side, the predetermined data being data which is acquired when the movement of the turning shaft has been limited by an end contact in which the turning shaft comes into contact with the housing; and the electronic control unit is configured to set an end-position-corresponding angle based on the plurality of limit position determination angles determined to be the predetermined data, the end-position-corresponding angle being an angle which indicates that the turning shaft is located at a right or left end position and which is correlated with the absolute steering angle.

7. The steering control device according to claim 6, wherein the electronic control unit is configured to calculate a determination variance value which is a variance value of n limit position determination angles using a following expression,
wherein the electronic control unit is configured to set a variance value of the plurality of limit position determination angles when the movement of the turning shaft has been limited by the end contact as a predetermined variance value, and
wherein the electronic control unit is configured to determine the n limit position determination angles to be the predetermined data acquired when a variance ratio is equal to or less than a variance threshold value which is set depending on n, the variance ratio being a ratio between the determination variance value and the predetermined variance value, $$Vd = \frac{1}{n-1}\sum_{i=1}^{n}(\theta i - \theta ave)^2$$

where θave is an average value of the n limit position determination angles.

8. The steering control device according to claim 7, wherein the electronic control unit is configured to compare a stroke width with a stroke threshold value corresponding to an entire stroke range of the turning shaft when the right and left limit position determination angles are acquired, the stroke width being a sum of an absolute value of the right limit position determination angle and an absolute value of the left limit position determination angle,
wherein the electronic control unit is configured to set the end-position-corresponding angles on the right and left sides based on the right and left limit position determination angles when the stroke width is greater than the stroke threshold value, and
wherein the electronic control unit is configured to set the end-position-corresponding angle on the right or left side based on the plurality of limit position determination angles on the right or left side which is determined to be the predetermined data when the plurality of limit position determination angles on only the right or left side is acquired.

* * * * *